United States Patent
Wagner et al.

(10) Patent No.: US 9,720,515 B2
(45) Date of Patent: Aug. 1, 2017

(54) METHOD AND APPARATUS FOR A GESTURE CONTROLLED INTERFACE FOR WEARABLE DEVICES

(71) Applicant: WEARABLE DEVICES LTD., Yokneam-Illit (IL)

(72) Inventors: Guy Wagner, Kiryat-Tivon (IL); Leeor Langer, Kiryat-Tivon (IL); Asher Dahan, Or-Akiva (IL)

(73) Assignee: Wearable Devices Ltd., Yokneam-Illit (IL)

( * ) Notice: Subject to any disclaimer, the term of this patent is extended or adjusted under 35 U.S.C. 154(b) by 0 days.

(21) Appl. No.: 15/202,750

(22) Filed: Jul. 6, 2016

(65) Prior Publication Data
US 2016/0313801 A1    Oct. 27, 2016

Related U.S. Application Data

(63) Continuation-in-part of application No. 14/588,592, filed on Jan. 2, 2015, now Pat. No. 9,612,661, and a
(Continued)

(51) Int. Cl.
*G06F 3/01*    (2006.01)
*G06N 3/08*    (2006.01)
(Continued)

(52) U.S. Cl.
CPC ............... *G06F 3/017* (2013.01); *G06F 1/163* (2013.01); *G06F 3/011* (2013.01); *G06F 3/014* (2013.01);
(Continued)

(58) Field of Classification Search
CPC .................................. G06F 3/011; G06F 3/016
See application file for complete search history.

(56) References Cited

U.S. PATENT DOCUMENTS 8,170,656 B2 *    5/2012    Tan .................... G06F 1/163
                                                    345/157
8,447,704 B2      5/2013    Tan et al.
(Continued)

FOREIGN PATENT DOCUMENTS

WO    WO2010/104879    9/2010

OTHER PUBLICATIONS

International Search Report for PCT application No. PCT/IL2015/051273 dated Apr. 19, 2016.
(Continued)

*Primary Examiner* — Ricardo L Osorio
(74) *Attorney, Agent, or Firm* — Pearl Cohen Zedek Latzer Baratz LLP

(57) ABSTRACT

A gesture-controlled interface apparatus includes one or a plurality of bio-potential sensors and a processor. The one or a plurality of bio-potential sensors are wearable on a body of a user, for detecting one or a plurality of bio-electrical signals from the body of the user, wherein the one or a plurality of bio-potential sensors include at least one surface nerve conduction (SNC) sensor for detecting at least one surface nerve conduction signal. The processor is configured to compare the detected at least one surface nerve conduction signal with data of a plurality of reference signals corresponding to a plurality of known gestures, each of the reference signals distinctly associated with one of the known gestures, to identify a known gesture from the plurality of known gestures that corresponds to said at least one surface nerve conduction signal, and to communicate the identified known gesture to a computerized device.

22 Claims, 23 Drawing Sheets

220 →

225 →

Related U.S. Application Data continuation-in-part of application No. PCT/IL2015/051273, filed on Dec. 31, 2015.

(51) Int. Cl.
*G09G 5/00* (2006.01)
*G06F 1/16* (2006.01)
*G09B 21/02* (2006.01)

(52) U.S. Cl.
CPC .............. *G06F 3/015* (2013.01); *G06F 3/016* (2013.01); *G06N 3/08* (2013.01); *G09B 21/02* (2013.01); *G09G 5/003* (2013.01); *G09G 2370/16* (2013.01)

(56) References Cited

U.S. PATENT DOCUMENTS

| | | | | |
|---|---|---|---|---|
| 8,935,119 | B2* | 1/2015 | Yuen | G01B 21/16 |
| | | | | 702/138 |
| 8,994,827 | B2* | 3/2015 | Mistry | H04N 5/2252 |
| | | | | 348/158 |
| 9,030,446 | B2* | 5/2015 | Mistry | G06F 3/0304 |
| | | | | 178/18.09 |
| 9,037,530 | B2* | 5/2015 | Tan | A61B 5/0488 |
| | | | | 706/62 |
| 9,079,060 | B2* | 7/2015 | Hong | A61B 5/7455 |
| 9,104,271 | B1* | 8/2015 | Adams | G06F 3/0426 |
| 9,170,674 | B2* | 10/2015 | Forutanpour | G06F 3/014 |
| 2007/0140562 | A1 | 6/2007 | Linderman | |
| 2014/0198035 | A1* | 7/2014 | Bailey | G06F 3/014 |
| | | | | 345/156 |
| 2014/0240103 | A1* | 8/2014 | Lake | G08C 17/02 |
| | | | | 340/12.5 |
| 2014/0240223 | A1 | 8/2014 | Lake et al. | |
| 2014/0266787 | A1 | 9/2014 | Tran | |
| 2014/0334083 | A1* | 11/2014 | Bailey | G06F 1/163 |
| | | | | 361/679.03 |
| 2015/0293592 | A1* | 10/2015 | Cheong | G06F 3/016 |
| | | | | 345/173 |
| 2015/0366504 | A1* | 12/2015 | Connor | A61B 5/6804 |
| | | | | 600/301 |

OTHER PUBLICATIONS

Bonato P. et al., "A Statistical Method for the Measurement of Muscle Activation Intervals from Surface Myoelectric Signal During Gait", IEEE Transactions on Biomedical Engineering, Mar. 1998, vol. 45, No. 3, pp. 287-299.

Severini G. et al., "Novel formulation of a double threshold algorithm for the estimation of muscle activation intervals designed for variable SNR environments", Journal of Electromyography and Kinesiology, Apr. 2012, vol. 22, pp. 878-885.

Jiang N. et al., "Myoelectric control of artificial limbs—is there a need to change focus", IEEE Signal Processing Magazine, Sep. 2012, vol. 29, No. 5, pp. 152-150.

Hamedi M. et al., "EMG-based facial gesture recognition through versatile elliptic basis function neural network", BioMedical Engineering OnLine, Jul. 17, 2013, vol. 12, No. 73, pp. 1-22.

Pamungkas D. et al., "Electro-Tactile Feedback for Tele-operation of a Mobile Robot", Proceedings of Australasian Conference on Robotics and Automation, Dec. 2-4, 2013, Intelligent System Lab, University of Wollongong, Australia, pp. 1-7.

Peruzzini M. et al., "Electro-tactile device for material texture simulation", The International Journal of Advanced Manufacturing Technology, Oct. 2013, vol. 68 No. 9-12, pp. 2185-2203.

Kruijff E. et al., "Using neuromuscular electrical stimulation for pseudo-haptic feedback", Proceedings of the ACM symposium on Virtual reality software and technology, Nov. 1, 2006, pp. 316-319.

Bach-y-Rita, P., "Tactile sensory substitution studies", Annals-New York Academy of Sciences, The Coevolution of Human Potential and Converging Technologies, May 2004, vol. 1013, pp. 83-91.

* cited by examiner

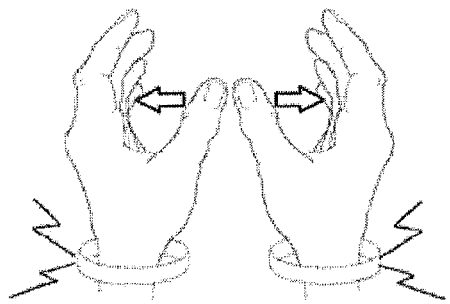
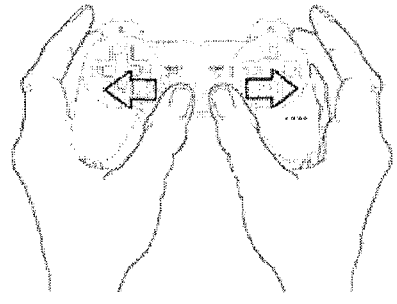
Fig. 11F                Fig. 11E PRIOR ART
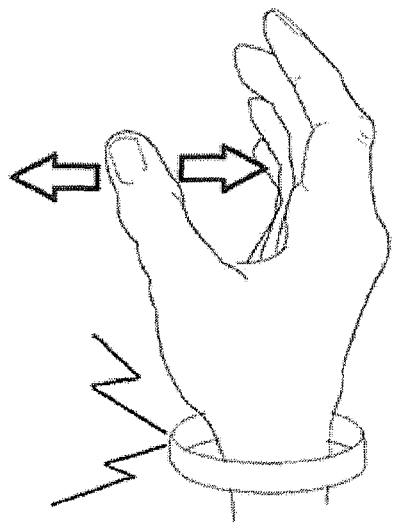
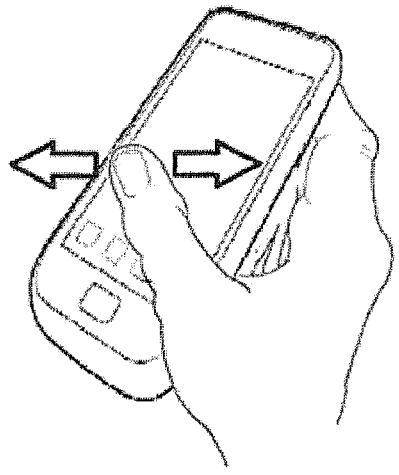
Fig. 11D                Fig. 11C PRIOR ART
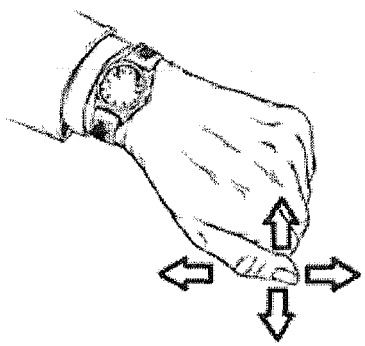
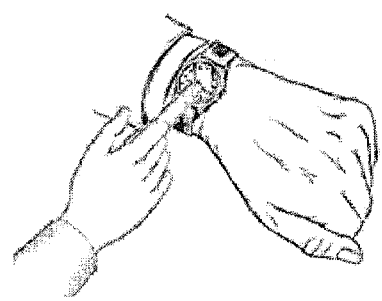
Fig. 11B                Fig. 11A PRIOR ART

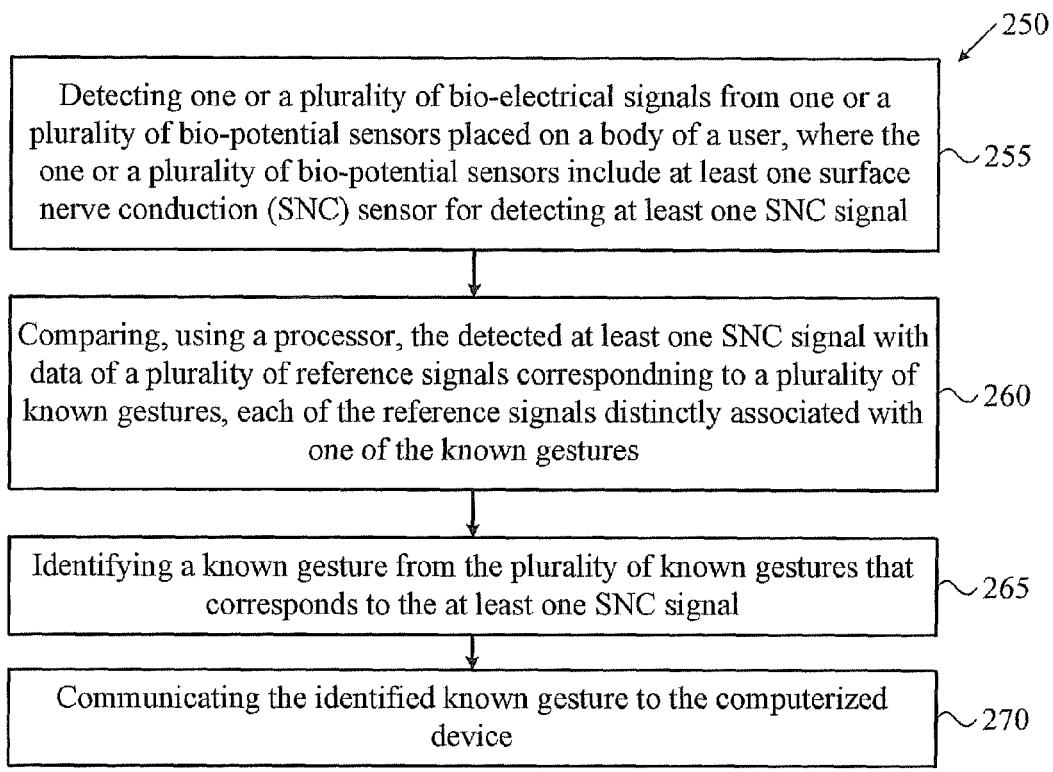
Fig. 15
Fig. 16
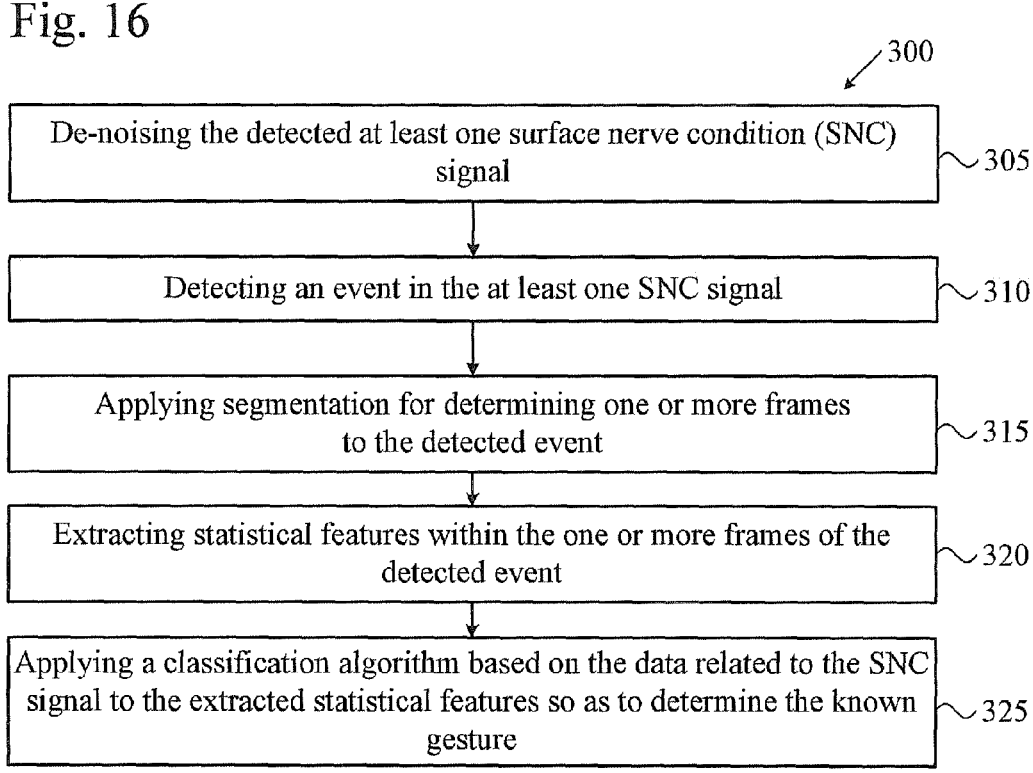

METHOD AND APPARATUS FOR A GESTURE CONTROLLED INTERFACE FOR WEARABLE DEVICES

CROSS REFERENCE TO RELATED APPLICATIONS

The present application is a continuation-in-part of U.S. patent application Ser. No. 14/588,592 filed on Jan. 2, 2015 and a continuation-in-part of International Patent Application No. PCT/IL2015/051273 filed on Dec. 31, 2015, claiming priority from U.S. patent application Ser. No. 14/588,592 filed on Jan. 2, 2015, both of which are incorporated herein by reference.

FIELD OF THE INVENTION

The present invention relates to wearable devices. More particularly, the present invention relates to bio-potential based interfaces for wearable devices.

BACKGROUND OF THE INVENTION

Natural language is intuitive for human communication. It relies on the spoken language, yet it is subconsciously based on body and hand gestures, where constant feedback is provided by the onlookers, for example via subtle body language, reacting to a speaker. On the other hand, human computer interfaces are not based on subtle human skills and are therefore cumbersome and unintuitive when compared to human spoken language and body language. Another example of a natural intuitive communication is music instruments such as violin or piano, where the musician uses gesture like movements to produce sound which is also used as an auditory feedback. In such a system the trained musician can play the instrument with no eye contact, with such feedback increasing the learning speed.

For many years, human-computer interactions have been mostly carried out using a standard "QWERTY" keyboard, with a screen providing a user with visual feedback of the keyboard (and mouse) input. With the constantly improving technology of computerized devices, these keyboards have now become a cumbersome means of communication. Currently, the most significant developments in the field of smart interfaces are based on computer vision using cameras and video analysis. However, this approach is limited due to the complexity of the visual data.

In recent years the touchscreen interface has become one of the most common solutions for inputting text or giving general instructions to the computer, whereby the touchscreen replaces the standard keyboard and mouse. However, using a touchscreen requires full concentration of the eyes and fingers on the screen, and an interface without the necessity of a direct view to the screen is not available today.

In search of more intuitive means for human computer interaction, other solutions such as voice recognition and gesture recognition (using a built-in microphone and/or camera) have become available in recent years; however these solutions have not been able to provide an accurate interpretation of the input. Voice recognition is based on one signal that cannot be easily deciphered (without a set of additional signals), while gesture recognition is based on computer vision and therefore highly sensitive to numerous ambient parameters.

An additional solution that has transitioned from medical applications (such as prosthesis biomechanical solutions) to generic human computer interfaces is a surface electromyography (sEMG) based device, providing recognition of coarse hand gestures for basic commands (e.g. controlling the grasp of a prosthesis) where the sEMG sensor is located near the elbow. However, such devices cannot easily detect subtle movements of the hand, for instance movement of a single finger, and therefore cannot effectively be used as an interface for a wider range of gestures. In addition, such devices require a sEMG sensor array to be located slightly below the elbow, which is an inconvenience for most users and therefore not yet widely accepted outside the medical community. Other devices are intended for the visually impaired and have a physical Braille display, but they do not provide a sEMG based interface and therefore cannot detect gestures. U.S. Pat. No. 8,447,704 describes an interface for recognition of a predefined set of general gestures based on sEMG signals.

There is therefore a need for an efficient and intuitive user interface for computerized machines that can recognize different types of subtle gestures (defined by the user) based on EMG signals. Moreover, with the development of Internet of Things (IoT) applicable devices, particularly wearable smart-watches, computer interfaces based on screens are becoming smaller and less convenient for complex interaction, due to the difficulty in closing a feedback loop between the user and the computerized device.

SUMMARY OF THE INVENTION

There is thus provided, in accordance with some embodiments of the present invention, a gesture-controlled interface apparatus including one or a plurality of bio-potential sensors, and a processor. The one or a plurality of bio-potential sensors are wearable on a body of a user, for detecting one or a plurality of bio-electrical signals from the body of the user, wherein the one or a plurality of bio-potential sensors include at least one surface nerve conduction (SNC) sensor for detecting at least one surface nerve conduction signal. The processor is configured to compare the detected at least one surface nerve conduction signal with data of a plurality of reference signals corresponding to a plurality of known gestures, each of the reference signals distinctly associated with one of the known gestures, to identify a known gesture from the plurality of known gestures that corresponds to said at least one surface nerve conduction signal, and to communicate the identified known gesture to a computerized device.

In accordance with some embodiments of the present invention, the apparatus is configured to fit onto a wrist of the user, where the at least one SNC sensor is configured to detect electrical signals from nerve bundles in the wrist.

In accordance with some embodiments of the present invention, the apparatus includes at least one motion sensor configured to detect movement of the body, and the processor is configured to identify the known gesture using the detected movement.

In accordance with some embodiments of the present invention, the apparatus includes haptic actuators configured to activate haptic feedback on the body of the user when the identified known gesture is registered in the computerized device.

In accordance with some embodiments of the present invention, the processor is configured to train the data for the body of the user by using the one or a plurality of bio-electrical signals to associate the at least one surface nerve conduction signal with each of the plurality of known gestures.

In accordance with some embodiments of the present invention, the one or a plurality of bio-potential sensors are selected from the group consisting of surface electromyography (sEMG) sensors, capacitive electromyography (cEMG) sensors, and skin conductivity sensors.

In accordance with some embodiments of the present invention, the processor is configured to filter electromyography (EMG) noise signals from the detected one or a plurality of bio-electrical signals by applying a discrete wavelet transform (DWT) with a surface nerve conduction (SNC) mother wavelet to the detected one or said plurality of bio-electrical signals.

In accordance with some embodiments of the present invention, the identified known gesture includes pressing together of at least two fingers, and the processor is configured to identify the pressing together of the at least two fingers by assessing that the at least one detected surface nerve conduction signal includes an amplitude and a frequency proportional to pressure applied between the at least two fingers.

In accordance with some embodiments of the present invention, the processor is configured to estimate the pressure applied between the at least two fingers.

There is further provided, in accordance with some embodiments of the present invention, a method for communication between a gesture-controlled interface apparatus and a computerized device including detecting one or a plurality of bio-electrical signals from one or a plurality of bio-potential sensors placed on a body of a user, wherein the one or a plurality of bio-potential sensors include at least one surface nerve conduction (SNC) sensor for detecting at least one surface nerve conduction signal. Using a processor, the detected at least one surface nerve conduction signal is compared with data of a plurality of reference signals corresponding to a plurality of known gestures, each of the reference signals distinctly associated with one of the known gestures. A known gesture is identified from the plurality of known gestures that corresponds to said at least one surface nerve conduction signal. The identified known gesture is communicated to a computerized device.

In accordance with some embodiments of the present invention, identifying the known gesture includes de-noising the detected at least one surface nerve conduction (SNC) signal, detecting an event in the at least one SNC signal, applying segmentation for determining one or more frames of the detected event, extracting statistical features within the one or more frames, and applying a classification algorithm based on the data to the extracted statistical features so as to determine the known gesture.

In accordance with some embodiments of the present invention, the known gesture includes pressing together of at least two fingers, and where identifying the pressing together of the at least two fingers includes assessing that the at least one detected surface nerve conduction signal includes an amplitude and a frequency proportional to pressure applied between the at least two fingers.

In accordance with some embodiments of the present invention, the method includes estimating the pressure applied between the at least two fingers by applying the one or a plurality of detected bio-electrical signals to a proportional control pipeline including a convolutional neural network (CNN) and a long short term memory (LSTM) neural network.

In accordance with some embodiments of the present invention, the method includes training the LSTM neural network by using an auxiliary signal.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 11A schematically illustrates a finger controlling a wrist watch as performed in the prior art;

FIG. 11B schematically illustrates a thumb gesture of controlling a wrist watch, in accordance with some embodiments of the present invention;

FIG. 11C schematically illustrates a thumb controlling a handheld device, as performed in the prior art;

FIG. 11D schematically illustrates a thumb gesture of controlling a handheld device, in accordance with some embodiments of the present invention;

FIG. 11E schematically illustrates thumbs controlling a game console, as performed in the prior art;

FIG. 11F schematically illustrates thumbs gesture of controlling a game console, in accordance with some embodiments of the present invention;

FIG. 15 is a flowchart depicting a method for communicating between a gesture-controlled flexible user interface and a computerized device, in accordance with some embodiments of the present invention;

FIG. 16 is a flowchart depicting a method for identifying a known gesture, in accordance with some embodiments of the present invention;

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

Figure 1A:
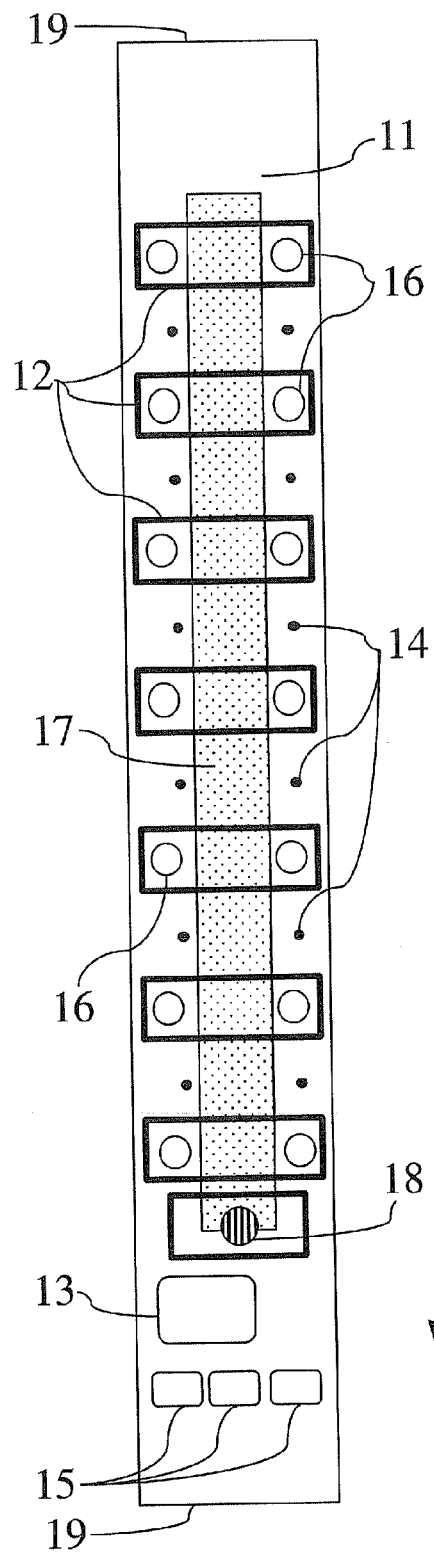
FIG. 1A schematically illustrates a frontal view of a flexible interface, in accordance with some embodiments of the present invention.

FIG. 1A schematically illustrates a frontal view of a flexible user interface 10, in accordance with some embodiments of the present invention. The user interface 10 comprises a Printed Circuit Board (PCB) with multiple elements configured to allow an interface between the user and a computerized device (for instance a tablet). The PCB of the user interface 10 is integrated into an elastic substrate 11, so that this user interface 10 may be transfigured by connecting the edges 19 in order to achieve a cylindrical shape capable of fitting onto a limb of a user (such as a flexible strap for a wrist-watch).

The PCB of the flexible user interface 10 comprises a plurality of bio-potential sensors 12 and an array of haptic feedback actuators 14, with a conducting strip 17 having corresponding wiring for these elements. Each sensor 12 may include at least two electrodes 16 in direct contact with the skin of the user, through which the signals are detected.

Optionally, the bio-potential sensors 12 are surface electromyography (sEMG) sensors, and the conducting strip 17 has several conducting layers for electrical power transfer and also for signal transfer. In some embodiments, other sensors are used instead of sEMG, for example capacitive electromyography (cEMG) sensors. It should be noted that electromyography sensors are capable of detecting signals derived from muscle movement, wherein these signals may be transportable along the limbs.

Preferably, the bio-potential sensors 12 are surface nerve conduction (SNC) sensors, capable of detecting nerve signals from the carpus, wherein these signals are caused by movement of the user. Specifically detecting signals from the three main nerves: the Median nerve, the Ulnar nerve, and the Radial nerve, as performed in standard medical diagnostic nerve conduction studies. It should be noted that in embodiments comprising SNC sensors, at least three SNC sensors may be required in order to accurately detect the nerve activity from the three main nerves (i.e., one sensor for each main nerve).

The PCB further comprises a wireless communication controller 13 providing wireless communication (e.g., with a Bluetooth transceiver) to nearby devices, and also motion sensors 15. These motion sensors 15 are preferably Micro-Electro-Mechanical Systems (MEMS) and may include an accelerometer (detecting acceleration), a gyroscope (detecting orientation), a magnetometer or any other combination of suitable sensors.

The correction achieved with this system may give a more accurate solution for gesture recognition than available with other systems, since the combination of the built-in accelerometer and gyroscope associated data provides movement information (with all possible orientations) which is not possible with only an accelerometer. Optionally, the bio-potential sensors 12 may be aligned in a configuration of multiple pairs in order to detect different sources of electric activity, since each nerve creates a signal in a specific location (for instance a sensor on the back side of an arm may not detect signals of movement on the front of the arm).

In a preferred embodiment, the communication controller 13 is a Bluetooth Low Energy (BLE) controller providing reduced power consumption for wireless communication.

It should be noted that the array of haptic feedback actuators is used as a user tactile feedback mechanism, instead of a screen based visual feedback, thereby creating a closed loop feedback. Closed loop feedbacks are an essential component for the success of any interface, as has been shown for prosthesis control by Jiang N. et al., "Myoelectric control of artificial limbs-is there a need to change focus", IEEE Signal Processing Magazine (2012), Vol. 29, No. 5, pp. 152-150, where the conclusions are relevant to human computer interaction in general. Such closed loop feedback can be learned by any user with minimal conscious effort and provides an important layer in human adaptation to such interface.

The sensors 12 may have a differential configuration, corresponding to the nature of the detected signal, and capable of detecting the electrical action potential generated in proximity to these sensors, by measuring the voltage difference between at least two corresponding electrodes 16 for each sensor 12. Such electrodes 16 are typically dry electrodes that may engage the skin of the user without requiring an additional substance (such as a gel) to improve skin conductivity. Thus, if the bio-potential sensors 12 are attached to the body of the user, every motion may be detected by these sensors due to the generated electrical action potential. With proper calibration of the received signal for known movements (e.g. a first clench), it may be possible to associate any signal received by the bio-potential sensors 12 with a movement of the body. Optionally, the distance between adjacent electrode pairs of bio-potential sensors 12 is ~1.5 cm, an optimal distance corresponding to known signal propagation rates in the body. In some embodiments, at least a portion of the user interface is rigid and not completely elastic (for example, similarly to hand watches).

Optionally, the conducting strip 17 is further connected to a reference driver 18 located at a predetermined position in the elastic substrate 11. This reference driver 18 restricts the electromyography input voltage to a predefined range, and may reject common noise such as fluorescent radiation and also standard 50 Hz/60 Hz radiation from power lines (causing noise in the measurement). It should be noted that a single reference signal from the reference driver 18 is used for all of the bio-potential sensors 12, and this is in contrast to typical use of sensors where each sensor typically drives its own reference through a driven right leg (DRL) circuit. Thus fewer elements may be used (and therefore consume less power and space) while keeping high accuracy of the sensors 12 since the quality of the output signal in the flexible user interface 10 does not degrade (as was shown in several tests carried out with this configuration). Optionally, it is also possible to use the common DRL mechanism instead of the aforementioned configuration.

In some embodiments of the present invention, each sensor from the bio-potential sensors 12 is also connected to an automatic gain controlled amplifier (AGC) in order to reduce signal variability (further described hereinafter). Optionally, all bio-potential sensors 12 are activated but only sensors detecting clear signals pass the data for further processing.

Figure 1B:
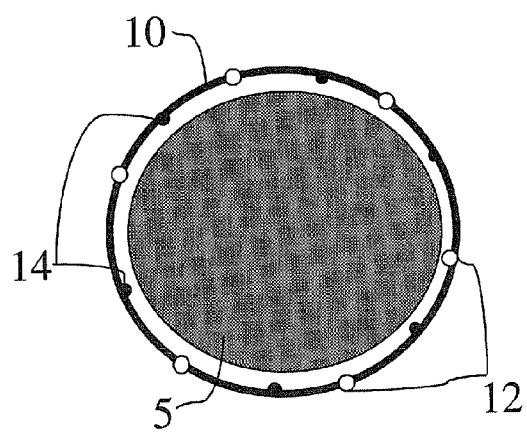
FIG. 1B schematically illustrates a cross-sectional view of the flexible PCB interface surrounding a wrist of a user, in accordance with some embodiments of the present invention.

FIG. 1B schematically illustrates a cross-sectional view of the flexible PCB user interface 10 surrounding a wrist 5 of a user, in accordance with some embodiments of the present invention. In this configuration all of the bio-potential sensors 12 and all of the haptic feedback actuators 14 are in direct contact with the skin of the wrist 5. Thus, any movement by the user's wrist 5 corresponds to an electrical action potential generated at the nerves and followed by potentials at the muscle cells, and may be detected by the bio-potential sensors 12. Additionally, the motion sensors 15 may detect some movements (due to change in position and orientation) that are not detected by the bio-potential sensors 12 as some gestures require little or no muscle movements at the measured area and therefore no noticeable electrical action potential is measured. Optionally, the user interface further comprises a display (for instance similarly to a display on a smart-watch) as an interface for the system.

By initially calibrating such movements or gestures according to the detected signals by these sensors, it will be possible at a later stage to associate a received signal with a gesture so that a user-computer interface may be created and tuned to a specific user. Such calibration processes are further described hereinafter. Once the calibration is complete, deciphering hand gestures (for instance in case that the flexible PCB user interface 10 surrounds a wrist) may allow controlling and operating devices having a computerized interface (such as PC, television or tablet) or other wearable devices (such as a smart-watch), wherein each gesture corresponds to a command received by the computer. This feature may perfect or even replace the current touchscreen interfaces.

In some embodiments, such an array of sensors may be integrated into the wrist band of an existing smart-watch, or alternatively may serve as a stand-alone device. Processing the data from these sensors may be accomplished with real-time "machine learning" using a digital signal processing unit (DSP) in the device. Optionally, such an array of sensors may be integrated into the wrist band of an existing standard watch, thus turning it into a smart-watch.

It should be noted that in a similar way the flexible PCB user interface 10 may surround a different part of the users body (typically surrounding a portion of a limb), wherein the bio-potential sensors 12 and the haptic feedback actuators 14 are in direct contact with the skin of the user. Optionally, this interface is imperceptible by the body such that users may move freely without disturbances from the device to their skin.

Figure 2:
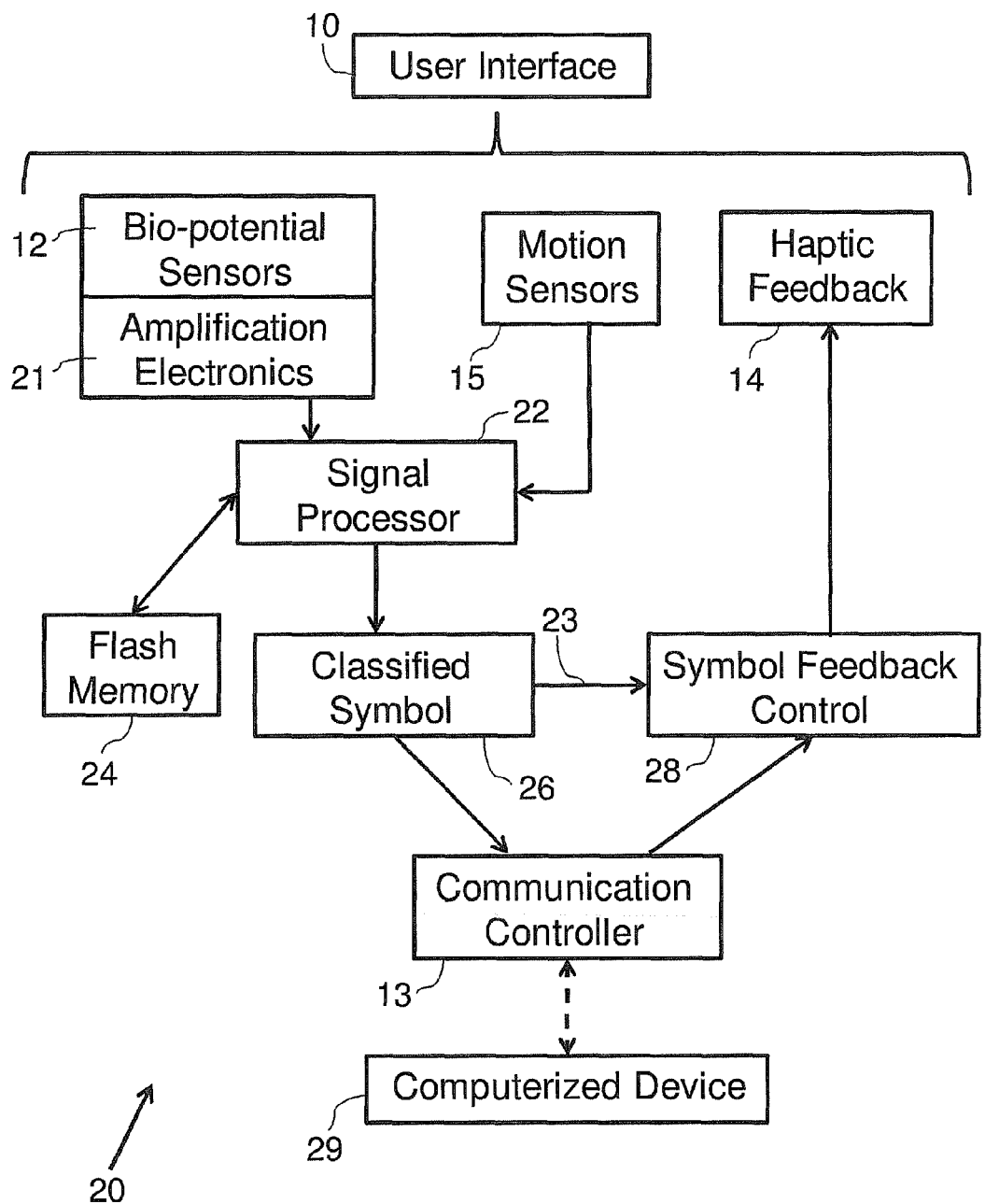
FIG. 2 depicts a block diagram of a gesture controlled system showing the information flow between a user interface and a computerized device, in accordance with some embodiments of the present invention.

FIG. 2 depicts a block diagram of a gesture controlled system 20, showing the information flow between the user interface 10 and a computerized device 29, in accordance with some embodiments of the present invention. The direction of the arrows indicates the direction of the information flow. The user interface 10 detects gestures and movements by the user (as described above). A signal processor 22 conditions the detected signals and applies a label to a dataset such that specific movements by the user are paired with commands corresponding to such known gestures which are transmitted to the computerized device 29. Thus the computerized device 29 may be controlled by the user interface 10, whereby the computerized device 29 may be any device having a computerized interface such as smartphones, PC, tablets, televisions, etc.

The user interface 10 detects gestures using the bio-potential sensors 12 and the motion sensors 15 (as described above). In order to enhance the received analog signal from the bio-potential sensors 12, additional amplification electronics 21 may be coupled to each bio-potential sensor 12, wherein the amplification electronics 21 may be embedded into the substrate 11 of the flexible user interface 10 (shown in FIG. 1A). Preferably, the electronics 21 may comprise an analog amplifier and/or an analog-to-digital converter (ADC), such that the analog signal is amplified and then converted to a digital signal for further processing at a later stage. In addition, each bio-potential signal 12 may also be coupled to an analog-gain-controller (AGC) such that the gain of the amplification electronics 21 is equalized, in order to assure a suitable voltage range.

The information received from the bio-potential sensors 12 and the motion sensors 15 is sampled in real-time and transmitted to the dedicated signal processor 22, wherein the signal processor 22 may be embedded into the substrate 11 of the flexible user interface 10 (shown in FIG. 1A). The signal processor 22 may perform basic signal conditioning processes and then derive a set of indicators for each signal. The signal processor 22 may then identify specific combinations of signals from these indicators, for instance using the methods of dimensionality reduction.

All data arriving to and from the signal processor 22 is stored in a flash memory module 24 in order to allow uploading of all such data to a database in a remote computerized device or a cloud based service. Such data may be gathered for analysis at a later stage for example in order to develop additional features requiring large amounts of exemplary data. In some embodiments, there is no need for a separate memory module.

In order to identify a particular gesture, the system 20 performs a classification process by sampling the memory module 24 and using predetermined internal parameters in order to assign the gesture to one of N+1 symbols ("N" being the known symbols, and a "NULL" symbol representing static mode when the user has not made a gesture). Once a particular gesture is classified as a symbol 26, the classified symbol 26 is transmitted as output to the communication controller 13. Thus, only known gestures are identified by the signal processor. Optionally, an immediate feedback of the symbol 26 may be transmitted 23 to the symbol feedback control 28.

The communication controller 13 may then transmit the classified symbol 26 as a corresponding command to the computerized device 29 via wireless communication (indicated with a dashed arrow). Once the computerized device 29 receives the command, an additional signal may be transmitted back to the communication controller 13 also via wireless communication, for instance a signal indicating that the command has been carried out. Alternatively, no signal is received from the computerized device 29 and the process stops here.

The communication controller 13 may transmit the corresponding signal from the computerized device 29 as input for the user interface 10. The received signal is then recognized by a symbol feedback control unit 28 that activates a corresponding haptic feedback to the user, using the haptic feedback actuators 14.

For example, the user makes a hand gesture corresponding to the command "open" (based on a calibrated set of commands) This command is classified as a symbol 26 and immediate feedback (i.e. data corresponding to the command) 23 is generated at the symbol feedback control 28 correspondingly. Simultaneously, the command is transmitted to a computerized device 29 interface such as that of a "smart television" via the communication controller 13. Once the "open" command is carried out, the television may send a signal back to the user interface 10 so that the user gets a haptic feedback without the need for direct eye contact between the user and the television.

This may be achieved with proper calibration giving appropriate sensory feedback identified for recognized hand gestures. A closed feedback loop is formed such that over time a relationship is created between the gestures of the user and the received feedback. In this way, the user may also "read" a sequence of symbols from the computerized device 29 by identifying the received haptic feedback. For example, user receives a text message and senses such a message using the haptic feedback mechanism 14, without the need for direct eye contact between the user and the computerized device 29. Such an example may be particularly relevant to a driver operating a vehicle, or to a visually impaired user.

In some embodiments of the present invention, once the computerized device 29 receives a recognized command, an auditory feedback is created such that the user may hear that the required command has been received and/or executed. Optionally, only an auditory feedback is carried out without a corresponding haptic feedback by the haptic feedback mechanism 14.

It should be noted that the user interface 10 described in FIGS. 1A-1B may further include additional elements in order to increase the accuracy of the gesture detection. Some of these elements are described hereinafter.

Figure 3:
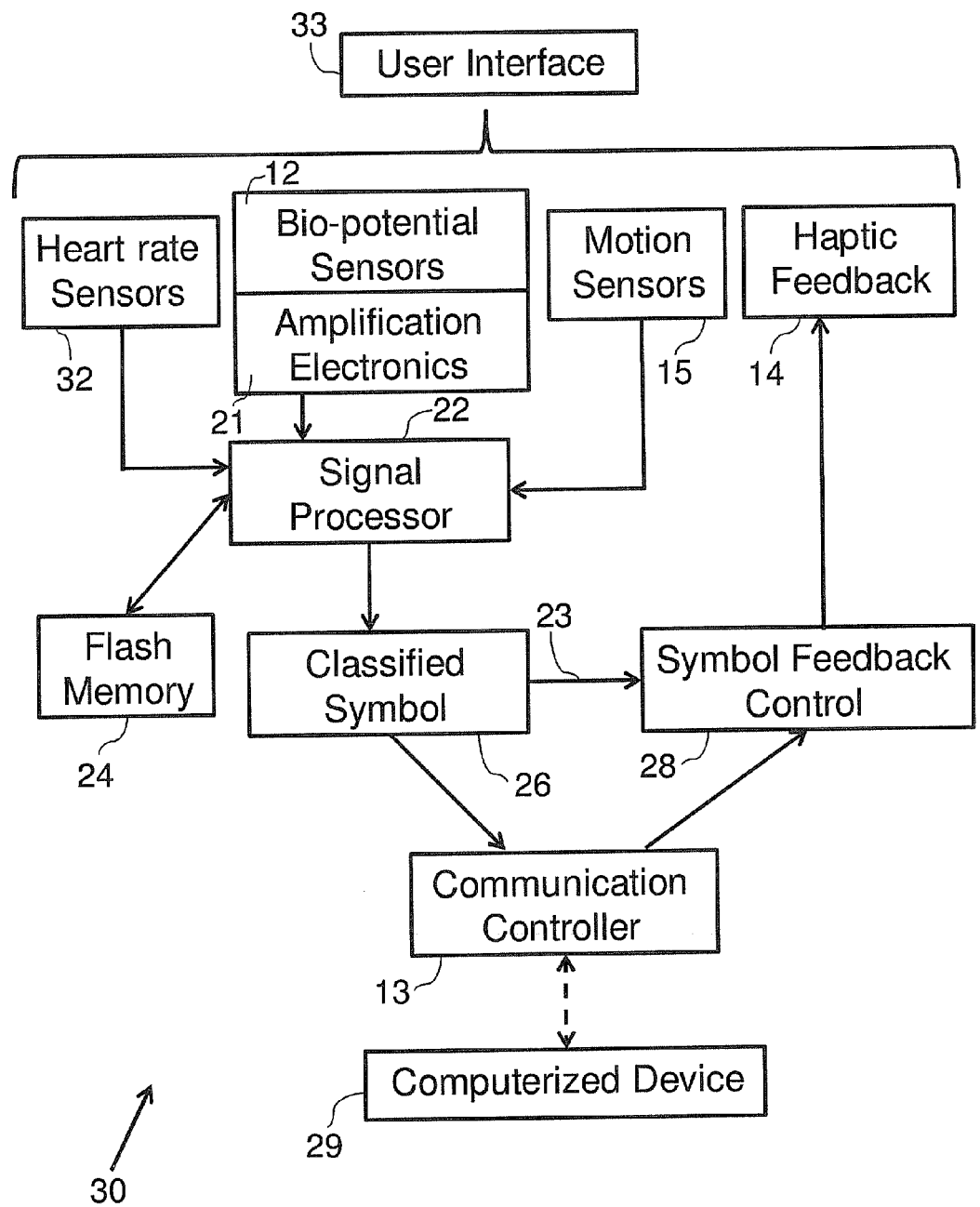
FIG. 3 depicts a block diagram of a gesture controlled system having additional heart rate sensors, showing the information flow between the user interface and a computerized device, in accordance with some embodiments of the present invention.

FIG. 3 depicts a block diagram of a gesture controlled system 30 having additional heart rate sensors 32, in accordance with some embodiments of the present invention. FIG. 3 shows the information flow between the user interface and a computerized device 29 (wherein the direction of the arrows indicates the direction of the information flow). The user interface 33 is further equipped with a plurality of heart rate sensors 32 that may detect the heart rate of the user (this feature is already available as an embedded element in some smartphones), for example optical sensors with a light beam penetrating the skin and bouncing off the blood vessels. Typically, the heart rate does not change during rest so the heart rate sensors 32 may provide cognitive effort/strain recognition.

The detected heart rate may be used as an indicator of the user's concentration during calibration of the system, wherein the user is training to create specific gestures and recognize haptic feedback patterns. If the heart rate sensors 32 indicate that the user is concentrated then the calibrated gesture may be assigned with a higher index, so that this specific gesture may be weighted differently, thus refining the calibration process. Additionally, the concentration of the user may be used to improve the entire communication process between the user and the computerized device 29 as unintentional gestures may be disregarded if the signal processor 22 does not receive the required indication from the heart rate sensors 32.

In some embodiments of the present invention, at least one skin conductivity sensor capable of measuring the skin impedance of the user may be provided, such that the calibration process may be carried out when a predetermined value of the skin impedance is measured. Optionally, the at least one skin conductivity sensor may be further combined with pulse and muscle tone sensors may provide optimal identification for the user's stimulation or concentration.

Figure 4A:
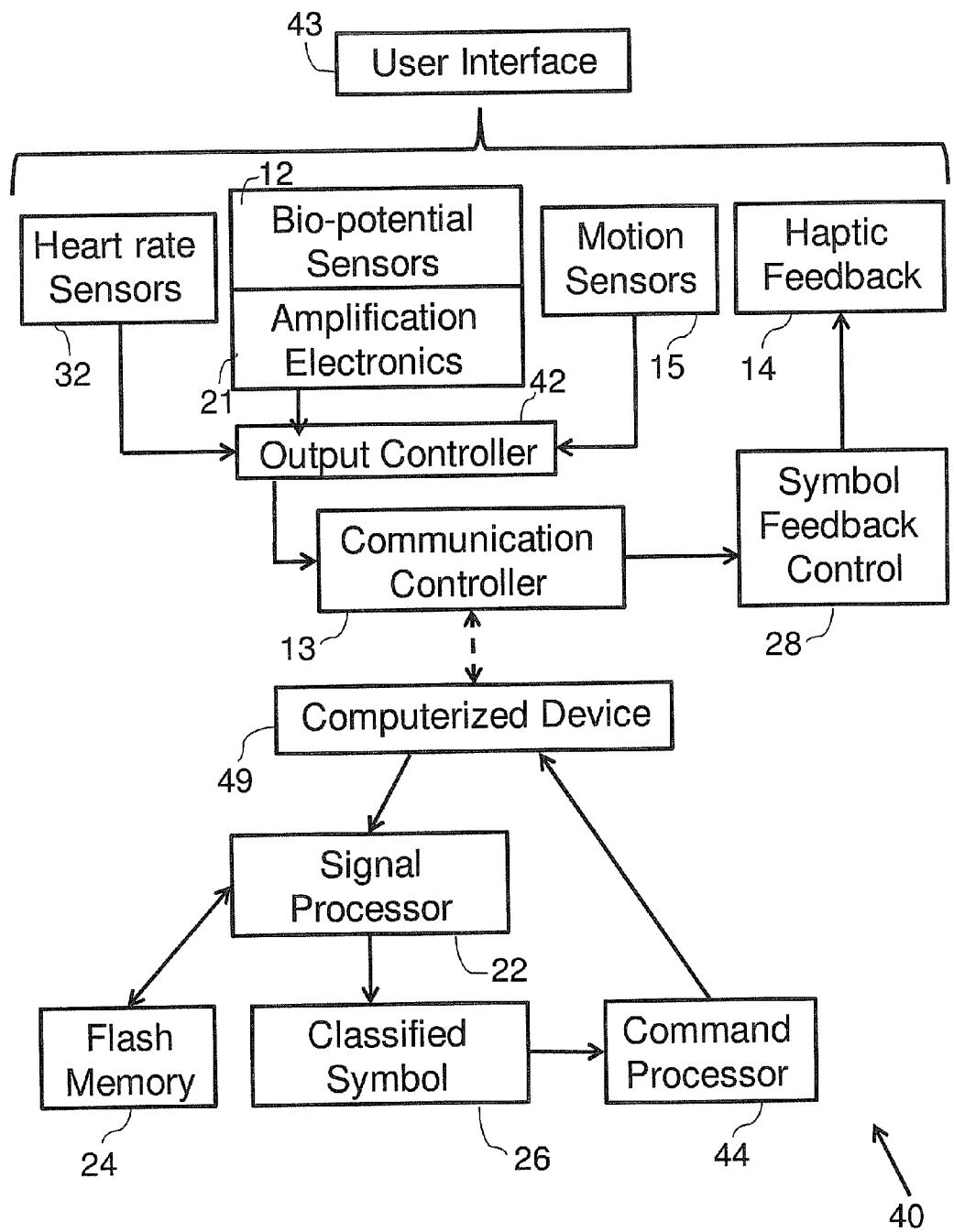
FIG. 4A depicts a block diagram of a gesture controlled system wherein all processing is carried out at a computerized embedded device, in accordance with some embodiments of the present invention.

FIG. 4A depicts a block diagram of a gesture controlled system 40, in accordance with some embodiments of the present invention, wherein all processing is carried out at a computerized device (the direction of the arrows indicates the direction of the information flow). In this embodiment 40, the signal processor 22, the flash memory 24, and the classified symbol 26 are all elements of the computerized device 49.

A signal from the user interface 43, namely from the bio-potential sensors 12, the motion sensors 15 and/or from the heart rate sensors 32, is transferred as output from an output controller 42 to the communication controller 13. This output may then be transmitted via wireless communication to the computerized device 49 in order to process these signals (as described above). The classified symbol 26 is transferred to a command processor 44 of the computerized device 49 so that the required command may be carried out.

In the case that a signal is transmitted back to the user (for instance in the case the command has been carried out), the signal that was transmitted via wireless communication to the communication controller 13 is transferred to the symbol feedback control unit 28 and finally to the haptic feedback actuators 14. It should be noted that the process carried out in this embodiment 40 is similar to the process described for the previous embodiments, wherein the main advantage having all processing carried out externally to the user interface 43, is saving space to be utilized for other applications. Additionally, electrical power may be saved at the user interface 43 as all power consuming computing is carried out remotely at the computerized device 49, so that a battery of the user interface 43 may last longer.

Prior to initial use of the gesture controlled system, a calibration of the system needs to be carried out. The calibration process is utilized as a signal detection mechanism which initially sets values for a resting mode (i.e. NULL gestures) where the only input should be noise, with a predetermined number of iterations. The calibration of the signal from the bio-potential sensors is carried out with the "double threshold" method in order to eliminate false information when carrying out signal calculations. This method has been described to be successful at detecting signal bursts in noisy background environments with sEMG in Bonato P.

et al., "A Statistical Method for the Measurement of Muscle Activation Intervals from Surface Myoelectric Signal During Gait", IEEE Transactions on Biomedical Engineering (1998), Vol. 45, NO. 3, pp. 287-299, and also in Severini G. et al., "Novel formulation of a double threshold algorithm for the estimation of muscle activation intervals designed for variable SNR environments", Journal of Electromyography and Kinesiology (2012), Vol. 22, pp. 878-885.

In the next step, the system learns to differentiate between different gestures (for instance a particular movement of the hand or of a specific finger). A user indicates that a specific gesture is performed, according to which the system learns a predefined set of internal parameters typical to the specific user. The system then stores these parameters in the internal flash memory. The user repeats this process NxM times, where N represents the number of gestures that the system detects at low error, and M represents the number of repetitions for the specific gesture. For example, repeating the gesture symbolizing the letter "E" twenty times, whereby different users may use different gestures to represent the same letter "E". Optionally, each user learns specific gestures based on a predefined training set.

In some embodiments of the present invention, the user interface is provided with an initial expanded training set. As most people have similar muscle activity for the same gesture, an initial training model may be attributed to a large group of people. An example of an efficient gesture prediction model which may utilize such large amounts of data is the "deep learning" method. Thus, an expanded training set may be provided together with the specific training set so that the user only learns the predetermined gestures (in a short period of time) instead of performing the full calibration process. An expanded training set may be applied to various populations, by matching a user to a model using user information. For example, a male user can be assigned to an expanded "male gesture model".

Figure 4B:
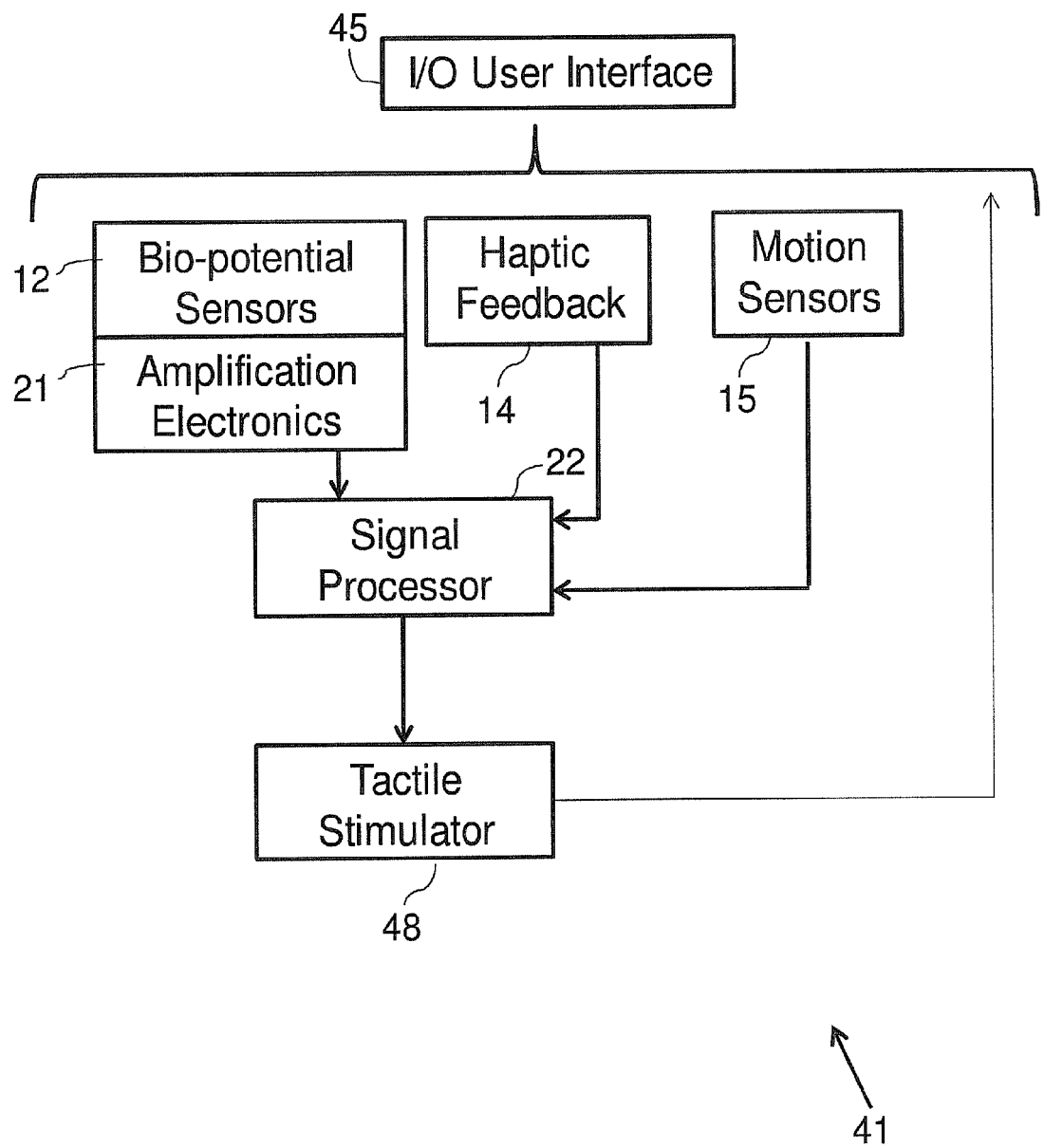
FIG. 4B depicts a block diagram of a gesture controlled system with an input/output interface, in accordance with some embodiments of the present invention.

FIG. 4B depicts a block diagram of a gesture controlled system 41 with an input/output interface, in accordance with some embodiments of the present invention. The direction of the arrows indicates the direction of the information flow. In this embodiment 41, the sensor array 12 and the haptic feedback actuators 14 function together as a generic input/output (I/O) interface for sensory substitution. In this configuration, electrical signals may be conditioned in the signal processor 22 and fed back directly to an I/O user interface 45 via an electro-tactile and/or vibro-tactile stimulator 48, not requiring a discrete classification. Such I/O interfaces may fully replace or augment various body sensory capabilities. For example, as a camera for the blind, as an inertial measurement unit (IMU) for people with vestibular loss or as a microphone for a deaf user that may be translated into direct tactile sensory input. Such examples and other uses are for instance discussed in Bach-y-Rita, P., "Tactile sensory substitution studies", ANNALS-NEW YORK ACADEMY OF SCIENCES (2004), Vol. 1013, pp. 83-91.

In some embodiments, all gestures and symbols are chosen so that simplest and shortest gestures are to be used to express the most common letters, syllables, words and sentences in the language of the user. In this way it may be possible to write faster than existing methods as direct eye contact is no longer required. An example of an implementation of this principle can be seen in Braille writing which can represent all the letters of the alphabet, as well as common English suffixes "tion", "ing" and common words like "the", "and". Thus writing text through trained gestures; or reading text through haptic feedback may be achieved.

In some embodiments of the present invention, the gesture controlled system may detect hand writing when the user holds a writing instrument (e.g. a pen). In this embodiment the system detects signals caused by muscles activated due to movement of the hand while writing.

In some embodiments of the present invention, the gesture controlled system may be used with a dedicated gesture based operating system, wherein all basic commands are gesture and haptic feedback oriented. With such an operating system, a screen will be optional as direct eye contact with the computerized device is not required. The interface of such an operating system may be purely command based, without a screen or a mouse and therefore may be particularly compatible with "Internet of Things" devices such as smart refrigerators.

Figure 5:
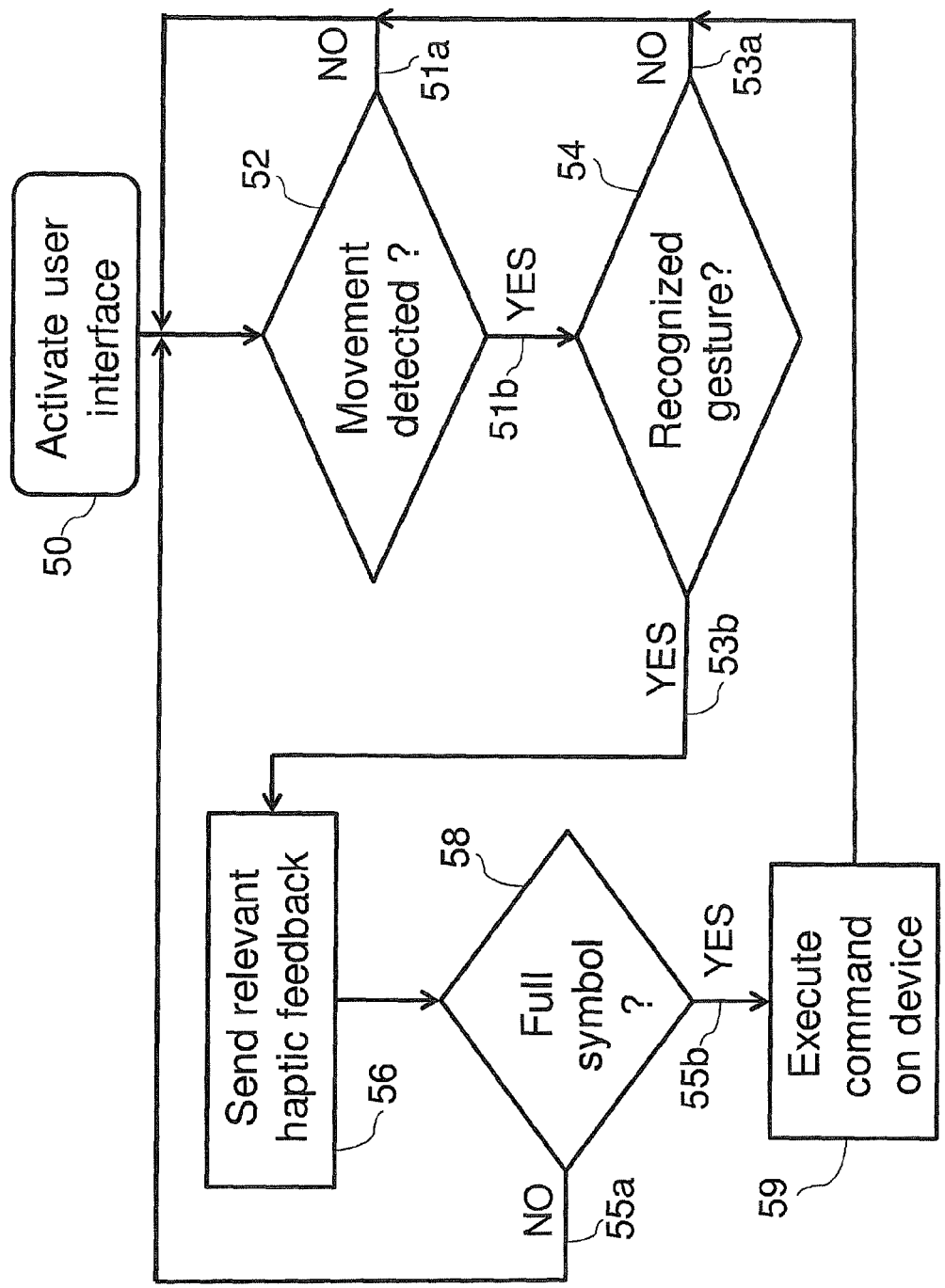
FIG. 5 depicts a flow chart for writing text using the gesture controlled system, in accordance with some embodiments of the present invention.

FIG. 5 depicts a flow chart for writing text using the gesture controlled system, in accordance with some embodiments of the present invention. Initially, the user interface is activated 50, wherein the user interface is connected to a computerized device via wireless communication. The system waits until signal activity is detected 52, either with the motion sensors and/or with the bio-potential sensors. While no movement is detected 51a the system returns to the initial state. Once a movement is detected 51b, the system checks whether the movement is a recognized gesture 54. If the movement is not a recognized gesture 53a, the system returns to the initial state until another signal activity onset is detected. Otherwise, if the movement is a recognized gesture 53b, a relevant haptic feedback, in addition to the execution of a command (if such command is applicable) is sent to the user 56 so that the user knows the correct gesture was registered, thereby forming a closed "human-machine" feedback loop.

Next, the system checks whether the recognized gesture is a full symbol 58 since a particular symbol (e.g. the letter "C") may include a set of several gestures. If the recognized gesture is not a full symbol 55a, then the system returns to the initial state until another onset is detected. Otherwise, if the recognized gesture is a full symbol 55b, the required command is executed on the computerized device 59. For example, the term "and" is written in a text message. Optionally, the full symbol 58 may further contain a time out mechanism, such that if a predetermined amount of time has passed before a sequence was completed, then all data pertaining to such a sequence is erased.

In some embodiments of the present invention, the array of haptic feedback actuators is positioned at the user interface with a configuration capable of creating different patterns. For example, a computerized watering system detects that a particular sprinkler has a malfunction. The watering system may then initially notify the user via the haptic feedback mechanism that the computerized watering system requires attention. Next, the computerized watering system may guide the user to the location of the broken sprinkler by activating different elements in the array of haptic feedback actuators to indicate a direction (for instance a specific actuator combination indicates to move right) until the system identifies that the user reached the broken sprinkler, e.g., using standard location based services.

Figure 6A:
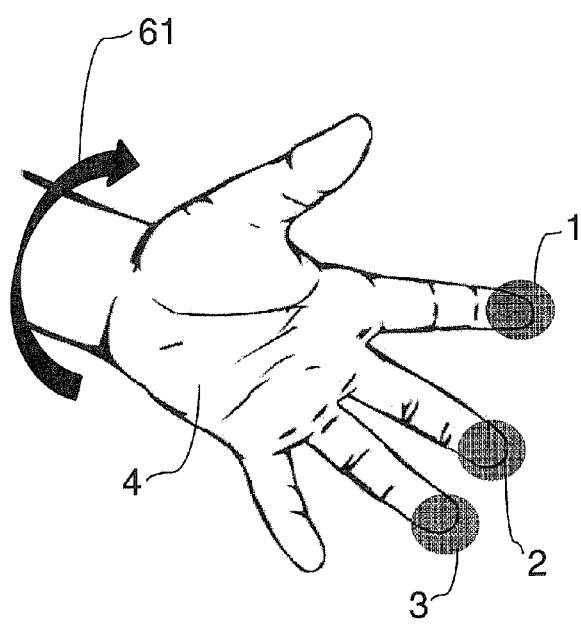
FIG. 6A schematically illustrates the hand of the user, in accordance with some embodiments of the present invention.
Figure 6B:
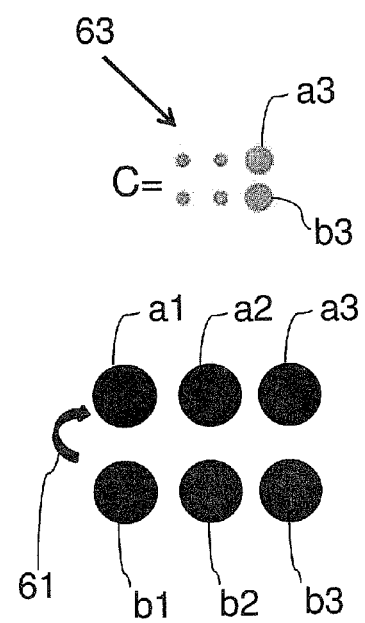
FIG. 6B schematically illustrates the symbol for the letter "C" in Braille, in accordance with some embodiments of the present invention.

Referring now to FIGS. 6A-6B, an exemplary use of the Braille language for the gesture controlled system is illustrated. FIG. 6A schematically illustrates the hand 4 of the user, in accordance with some embodiments of the present invention. Using the Braille language, gestures may be created by bending the index finger 1, bending the middle finger 2, bending the ring finger 3, or also by rotating 61 the hand 4.

FIG. 6B schematically illustrates the symbol for the letter "C" in Braille 63, in accordance with some embodiments of the present invention. In order to make a gesture corresponding to the letter "C" in Braille 63, the user needs to bend the ring finger a3 while rotating 61 the hand 4 and finally bend the ring finger b3. In a similar way all letters of the alphabet may be represented using the Braille language, so that it may be possible to write and/or read text without the need of direct eye contact with the screen. It should be noted the Braille type language can be implemented with various gesture sequences. Optionally, different types of haptic feedback are generated to correspond with specific letters and words.

The main advantages of such gesture controlled systems are:

Freedom of operation-proficient users can operate a device as described above with a small amount of cognitive resource allocation. This enables such users to simultaneously perform complex operations (such as driving and writing).

Provide accessibility to modern smart devices for the visually and auditory impaired.

Releasing the eyes and ears—from looking at the screen and listening to speech.

Protecting privacy—from possible harm when using voice recognition interfaces, or when the screen is visible to others.

In some embodiments of the present invention, the gesture controlled system may be used as a stand-alone product, thus exposing the interface to application program interfaces (APIs) for the purpose of general integration into original equipment manufacturer (OEM) systems that may allow saving resources (electric power, processing power etc.).

Figure 7A:
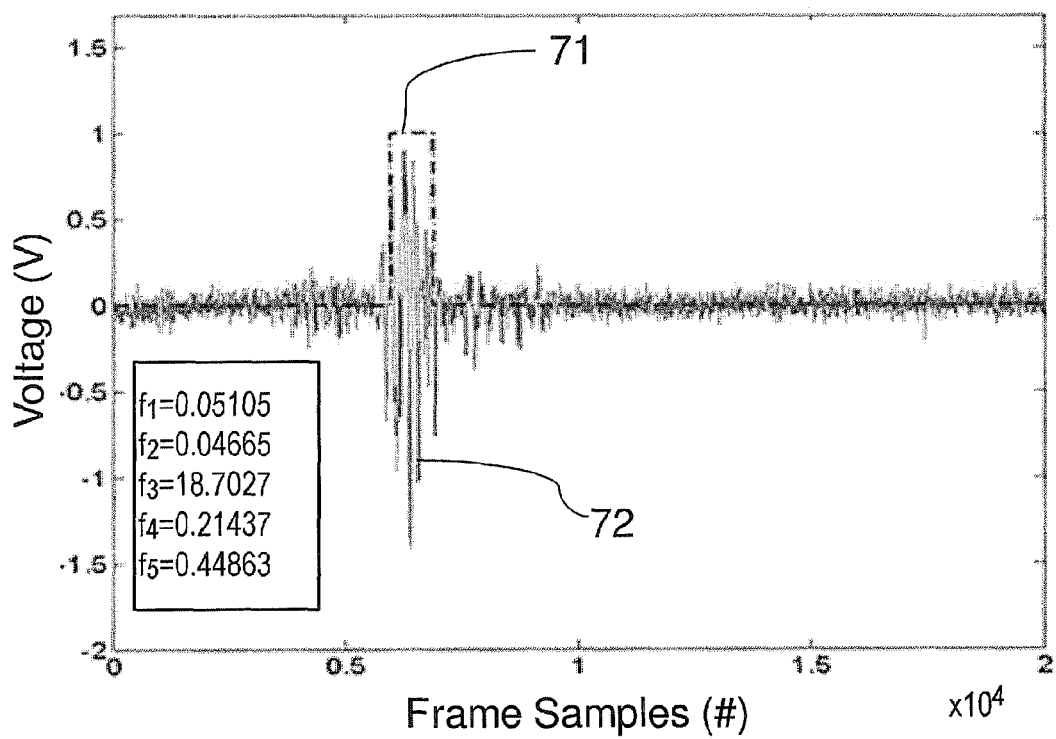
FIG. 7A shows a signal generated by an index finger movement, in accordance with some embodiments of the present invention.
Figure 7B:
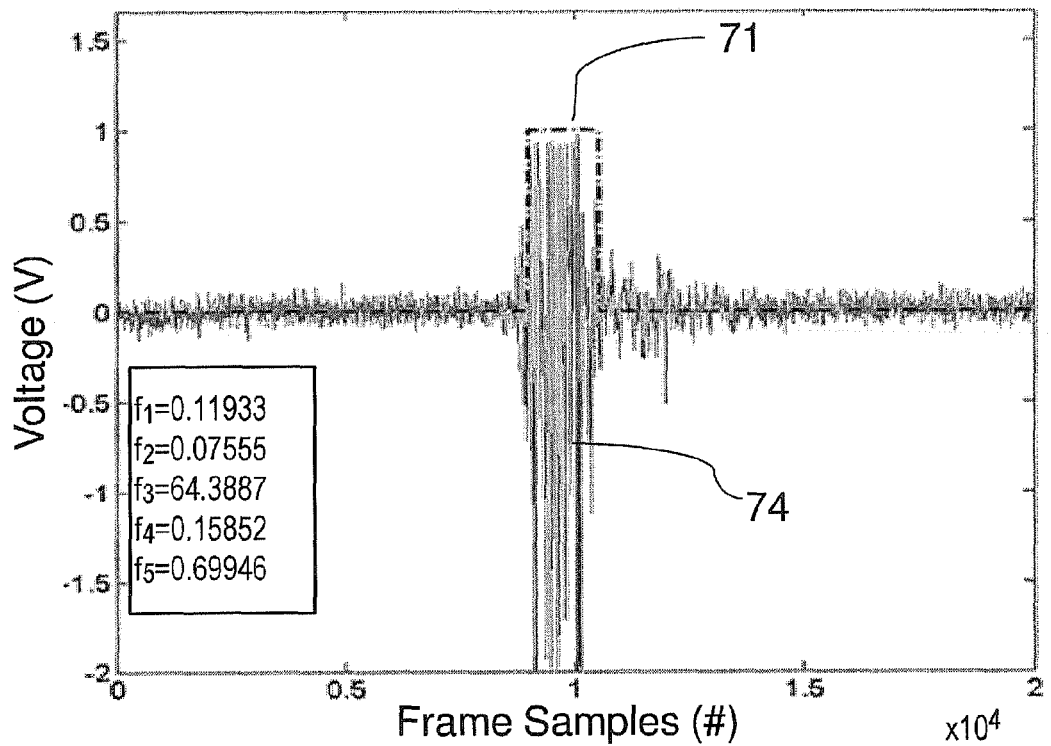
FIG. 7B shows a signal generated by a middle finger movement, in accordance with some embodiments of the present invention.
Figure 7C:
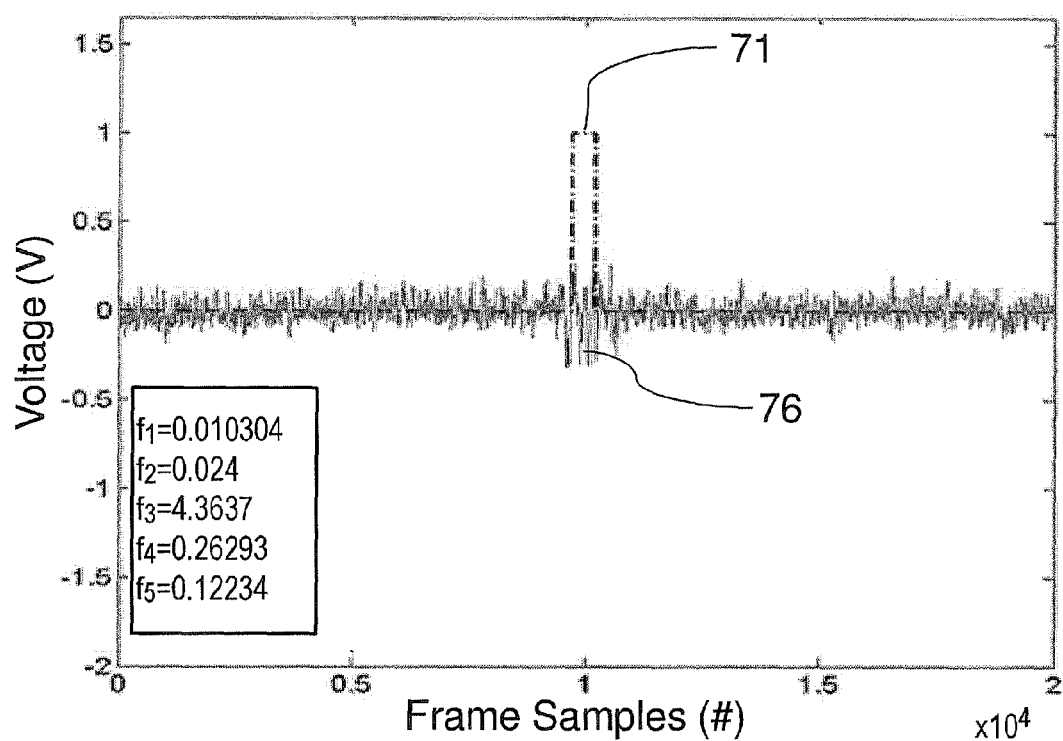
FIG. 7C shows a signal generated by a thumb movement, in accordance with some embodiments of the present invention.
Figure 7D:
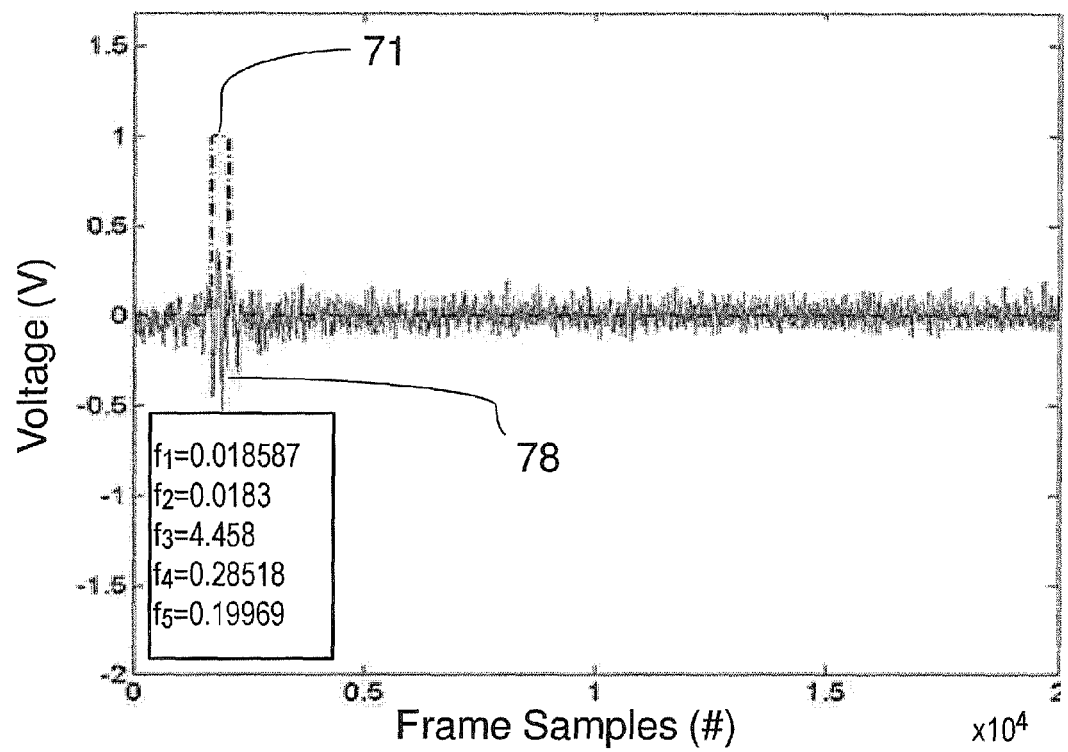
FIG. 7D shows a signal generated by a first clench movement, in accordance with some embodiments of the present invention.

Referring now to FIGS. 7A-7D, these figures show graphs of SNC signal behavior detected with a sensor positioned between the Radial and Ulnar nerves, for different gestures carried out by the user. FIG. 7A shows a signal 72 generated from a thumb movement, in accordance with some embodiments of the present invention. FIG. 7B shows a signal 74 generated from an index finger movement, in accordance with some embodiments of the present invention. FIG. 7C shows a signal 76 generated from a first little finger movement, in accordance with some embodiments of the present invention. FIG. 7D shows a signal 78 generated from a second little finger movement, in accordance with some embodiments of the present invention. It can be easily seen from these figures that different gestures gave different signal behavior, differentiating both in typical time duration of the signal and also in typical electrical behavior detected by the SNC sensors (i.e. different gestures cause different voltage spikes). However, a more accurate algorithm (measuring additional parameters) may be used in order to identify different gestures carried out by the user.

In all of the FIGS. 7A-7D, a binary signal 71 indicates when the system identifies that a gesture has been carried out. Using the double-threshold method (as described above), the noise is ignored and the system only reacts to actual gestures.

Figure 8A:
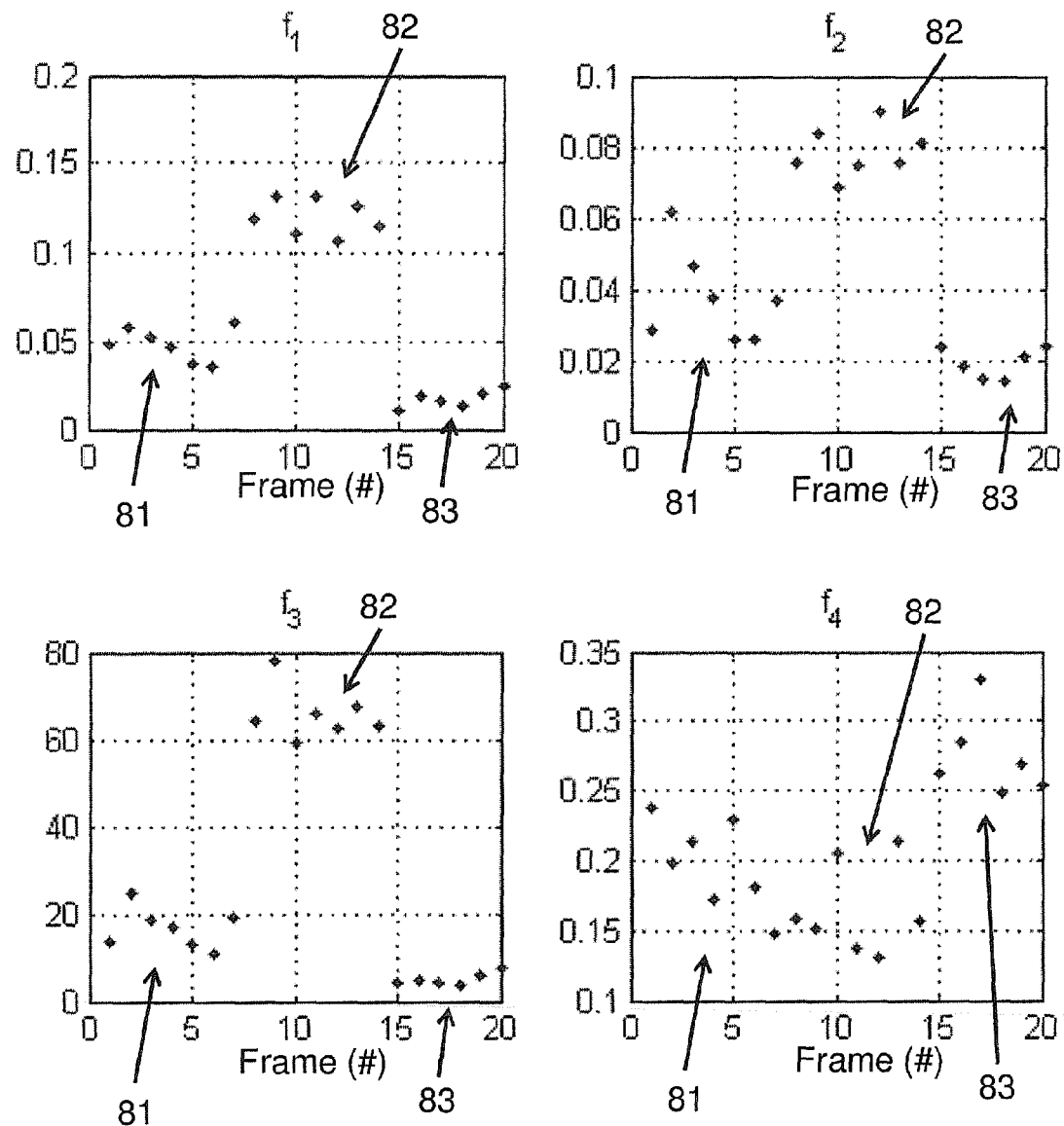
FIG. 8A shows plots for three types of gestures classified according to different features of the sEMG signal, in accordance with some embodiments of the present invention.
Figure 8B:
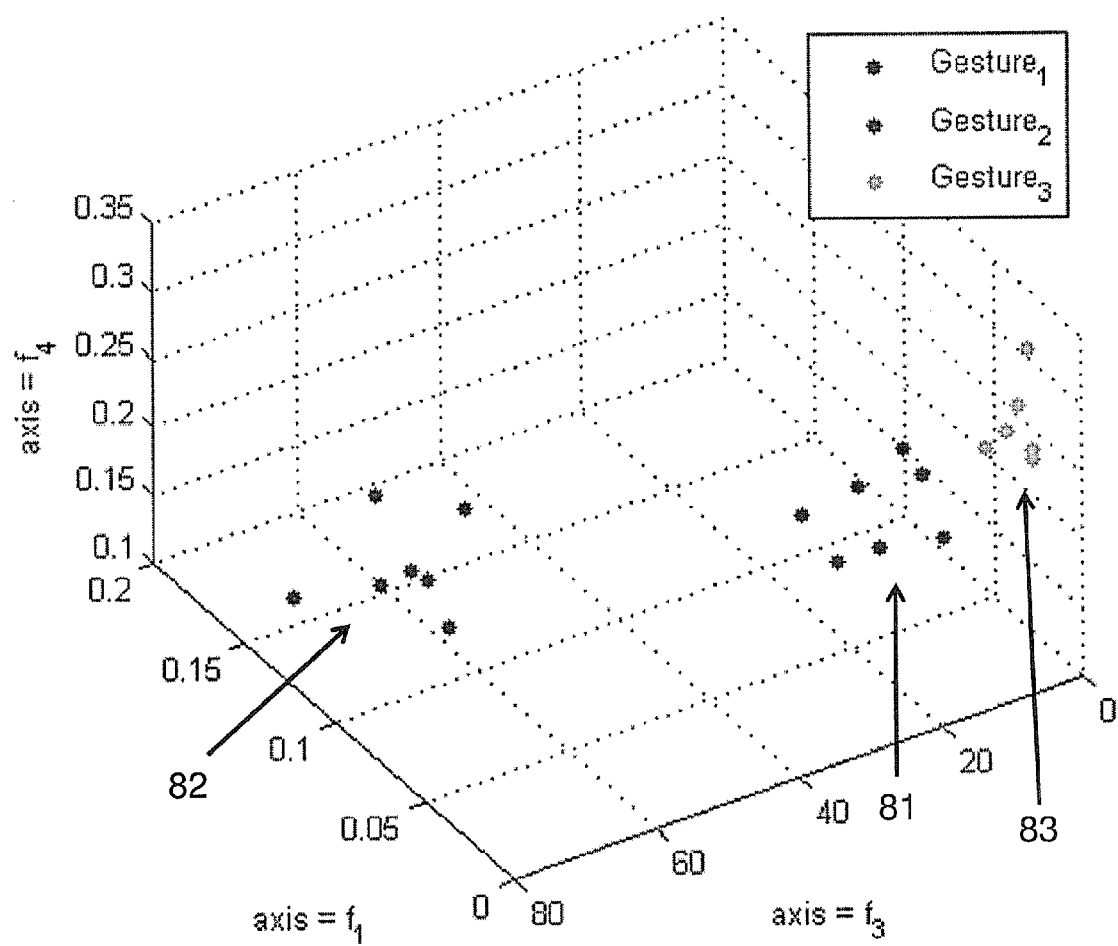
FIG. 8B shows a three dimensional plot including prominent features measured for the three types of gestures, in accordance with some embodiments of the present invention.

Referring now to FIGS. 8A-8B, these figures show exemplary results of a gesture classification algorithm using a single bio-potential sensor. In this exemplary algorithm, the length of a measurement frame is denoted as $N_f$, with signal samples $x_i$ ($x_1, x_2, \ldots x_{Nf}$). The corresponding binary signals (indicating that a gesture is detected, for instance as shown in FIGS. 7A-7D) are denoted as $\text{sig}_{det}$ so that the samples of a frame where myoelectric activity is detected are denoted as $\text{sig}_{det}=1$, and similarly the samples corresponding to noise are denoted as $sig_{det}=0$. Finally, five exemplary statistical features are defined to classify an SNC signals properties:
Chi-Square Sum:

$$f_1 = \Sigma_{i=1}^{N_f} sig_{det}^{1}(i) \cdot z(i), z(i) = x_{i+1}^2 - x_i^2 \quad (1)$$

Sum Length of Detection:

$$f_2 = \Sigma_{i=1}^{N_f} sig_{det}^{1}(i) \quad (2)$$

Arc Length:

$$f_3 = \Sigma_{i=1}^{N_f} |x_{i+1} - x_i| \quad (3)$$

Gini index (dispersion index):

$$f_4 = \frac{\sum_{i:sig_{det}=1} \sum_{j:sig_{det}=1} |x_i - x_j|}{2n^2 \mu} \quad (4)$$

where $\mu$ is the mean and n is the number of positive detected indices wherein sigdet=1.
Mean Absolute Value:

$$f_5 = \frac{1}{n} \cdot \sum_{i:sig_{det}=1} |x_i| \quad (5)$$

Taking all of these features into account for each measurement may create a signal signature so that different gestures may be differentiated. The first feature measures a signals activity in the chi-squared statistical distribution domain. The second feature measures a signals detection length. The third feature measures the activity in the time domain using the absolute derivative. The fourth feature is a modern measure of dispersion. The fifth feature is the mean absolute amplitude.

During the measurement, twenty frames were sampled including three gestures: seven gesture repetitions for index finger movement 81, seven gesture repetitions of a first clench 82, and six gesture repetitions of little finger movement 83 (in total having twenty frames). All of the above-mentioned features need to be taken into account in order to accurately classify these features.

FIG. 8A shows plots with three types of gestures 81, 82, 83 classified according to different features $f_1$-$f_4$ of the SNC signal, in accordance with some embodiments of the present invention. It can be seen from these plots that different gestures gave different pattern behavior, however in order to accurately classify the gestures these features must be embedded in a multi-dimensional feature space so that each gesture is clearly separated and clusters are formed.

FIG. 8B shows a three dimensional scatter plot including prominent features measured for the three types of gestures 81, 82, 83, in accordance with some embodiments of the present invention. The axes of this scatter plot are the features $f_1$-$f_3$-$f_4$ which define such a "feature space" as described above. The classification algorithm may use a labeled set of SNC data features and outputs segmentation such that each gesture cluster is separated in the feature space. When a new gesture is sampled and its features (or signature) are calculated, a corresponding "point in the multi-dimensional feature space" will be assigned a segment (i.e., a gesture). It should be noted that only a single SNC sensor was used in this example, and multiple sensors may enable better gesture type recognition and improved generalization performance.

It should be clarified that although the example provided herein uses particular features, one can use other features or algorithms without limiting the scope of the present invention.

Figure 9:
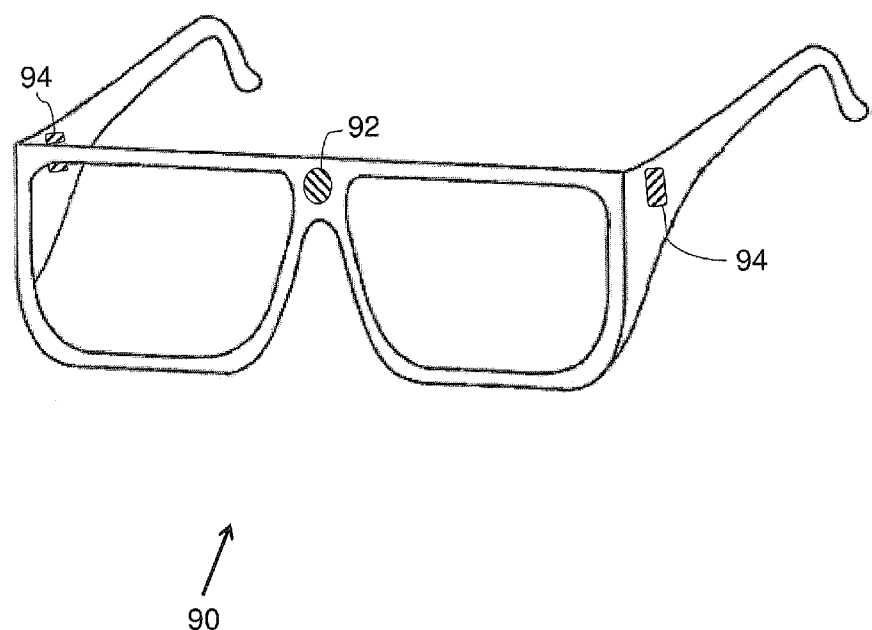
FIG. 9 schematically illustrates a facial gesture controlled system, in accordance with some embodiments of the present invention.

FIG. 9 schematically illustrates a facial gesture controlled system 90, in accordance with some embodiments of the present invention. In addition to the gestured mentioned above (detected by a system surrounding a portion of a limb of the user), EMG sensors may also be utilized for facial gesture recognition. For example, EMG sensors may detect facial gestures of the *frontalis* muscle (located at the forehead) and the temporalis muscle (located at the temples), as discussed in Hamedi M. et al., "EMG-based facial gesture recognition through versatile elliptic basis function neural network", BioMedical Engineering OnLine (2013), Vol. 12, NO. 73.

Facial gestures cannot be detected by the system fitted onto a limb of the user, and therefore require a different system that may be fitted onto the head of a user while operating similarly to the systems described above since only the type of gestures is changed. Preferably, such a system is embedded into wearable devices such as eye glasses. Such systems may be provided as a stand-alone product (where the eye glasses are not utilized for improved vision), coupled onto existing eye glasses, or embedded into smart-glasses such that the gesture recognition is an additional feature of the glasses.

The facial gesture controlled system 90 is embedded into a device wearable on the head of the user (for instance glasses) and may operate similarly to the system described above (e.g., similarly to the gesture controlled system 20, as shown in FIG. 2). The facial gesture controlled system 90 comprises a forehead EMG sensor 92 corresponding to the frontalis muscle and capable of recognizing facial gestures at the forehead. The facial gesture controlled system 90 further comprises at least one temple EMG sensor 94 corresponding to the temporalis muscle and capable of recognizing facial gestures at the temples. Optionally, at least one temple EMG sensor 94 may be coupled to at least one haptic feedback actuator such that the facial gesture controlled system 90 may be calibrated to recognize face gestures, and then the user may receive haptic feedback (at the temples) for the recognized gestures.

Such a system may be useful in at least one of the following:

Control of computerized devices, such as smart-glasses using facial gestures.

A trained user may be able to recognize facial gestures from the received feedback. In this way two remotely paired users can get remote feedback for each other's facial gestures, and be able to recognize feelings and other nuances that are usually noticed only when meeting face to face. This can enrich electronic communication by conveying feelings and body language along with text, voice and video that is usually being used.

Control of computerized devices using facial gestures, for users that have physical trouble manipulating their limbs.

Combining such a system with image processing based facial gesture recognition may help visually impaired users to recognize the feelings and facial gestures of their partner.

Furthermore, such systems may be used for working with autistic users in order to improve empathic skills.

Figure 10A:
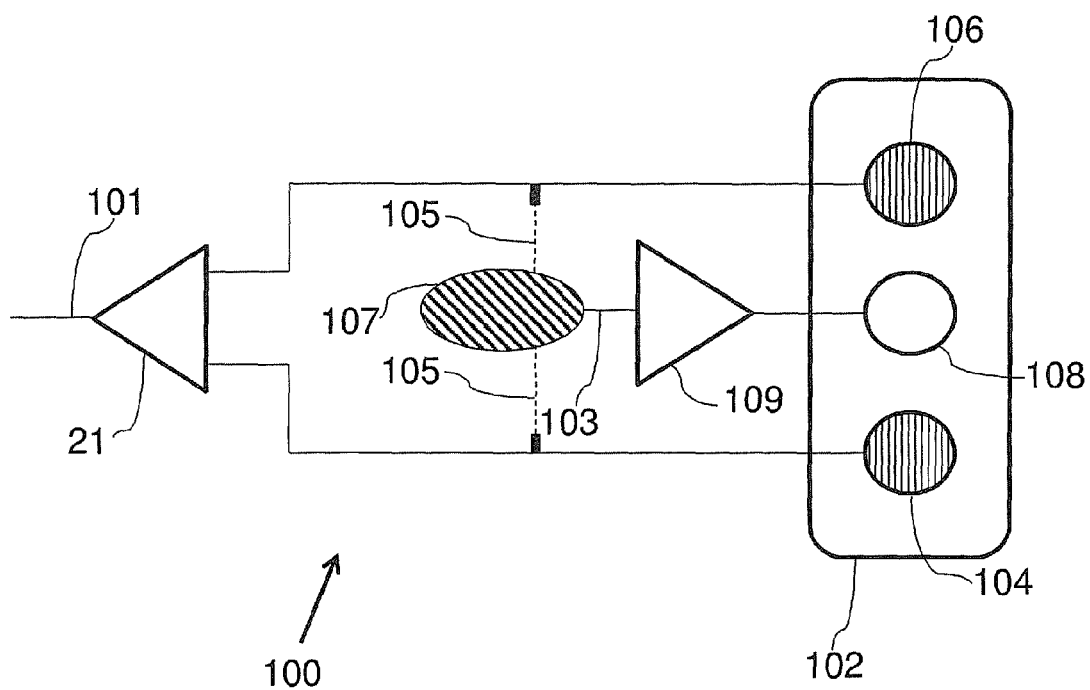
FIG. 10A schematically illustrates exemplary circuitry of a combined sensor and haptic feedback actuator, in accordance with some embodiments of the present invention.
Figure 10B:
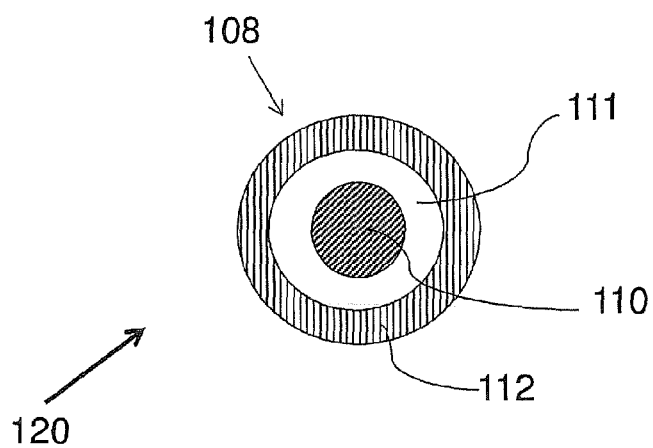
FIG. 10B schematically illustrates a cross-sectional view of an exemplary circuitry of the combined sensor with concentric rings, in accordance with some embodiments of the present invention.

Referring now to FIGS. 10A-10B, these figures relate to a further embodiment where the haptic feedback is embedded into the EMG sensor. While EMG is the reading of nerve action potentials generated at the muscles, NeuroMuscular Electrical Stimulation (NMES) is actually the opposite action, where electrical signals are used to stimulate the motoric nerves and cause muscular contractions. Electro-Tactile Stimulation (ETS) is the use of electric potentials to activate the nerve fibers connected to the tactile sensory receptors underneath the skin.

Recent studies have shown that NMES and Electro-tactile methods can involve haptic feedback and tactile display, while NMES is usually used to simulate force sensing (such as feeling the resistance of pushing a heavy object) and Electro-tactile display are used to simulate the sense of touch, such as textures. Some examples of these studies may be found in Pamungkas D. et al., "Electro-Tactile Feedback for Tele-operation of a Mobile Robot", Proceedings of Australasian Conference on Robotics and Automation, University of New South Wales, Australia (2013), Peruzzini, M. et al., "Electro-tactile device for material texture simulation", IEEE (2012), pp. 178-183, and Kruijff, E., et al., "Using neuromuscular electrical stimulation for pseudo-haptic feedback", Proceedings of the ACM symposium on Virtual reality software and technology (2006), pp. 316-319.

In this embodiment, the EMG sensor is combined with the NMES and ETS to create a single unit capable of both sensing EMG and generating haptic feedback. In addition to its immediate use with the gesture controlled system, such a combined sensor-actuator may generate haptic feedback for finger movements to facilitate reading and notification receiving. In particular, such a device may be used in the field of prosthetics where a prosthetic arm may be controlled by an EMG sensor and then provide feedback to the user regarding texture and force. Optionally, the combined sensor-actuator may also be used in the field of remote controlling of computerized robots and machines. In some embodiments, the combined sensor-actuator may further be combined with a pulse sensor and/or a galvanic skin response (GSR) sensor.

FIG. 10A schematically illustrates exemplary circuitry of a combined sensor and haptic feedback actuator, in accordance with some embodiments of the present invention. The amplifier driven right leg (DRL) element 21 of the bio-potential sensor 12 (for instance as shown in FIG. 2) circuitry can be used also as an ETS and NMES stimulator to generate haptic feedback as well as reading muscular electrical potentials. Since the EMG (e.g., sEMG/cEMG) is basically a differential amplifier, the stimulating signal that will be added to the common mode signal driven to the body through the DRL will not be amplified by the EMG sensor.

In standard DRL circuits, the EMG signal 101 is collected at a positive electrode 104 and a negative electrode 106 to be amplified using the differential amplifier 21 to generate an amplified EMG signal. Simultaneously, the EMG signals 105 from electrodes 106, 104 are averaged at a stimulator 107 to generate a common mode signal 103 that is later amplified by an additional amplifier 109 and driven to the user's skin through a reference electrode 108. In this embodiment, a stimulating current signal is combined with the common mode signal at the stimulator 107, going through the same path to the reference electrode 108 where it stimulates the skin nerves.

FIG. 10B schematically illustrates a cross-sectional view of an exemplary circuitry of the combined sensor with concentric rings, in accordance with some embodiments of the present invention. A further embodiment 120 shown in FIG. 10B, comprises the reference electrode 108 that includes two concentric rings with an internal electrode 110, and an external electrode 112 separated from the internal electrode 110 by a nonconductive material 111, where the stimulating signal is driven to the internal electrode 110 and the common mode signal is driven to the external ring electrode 112. In some embodiments of the present invention, the skin conductivity of the user's wrist is measured between the two electrodes by measuring the amplitude generated by driving the current through the impedance of the skin with the bio potential sensor. Since the current is constant and controlled by the device, the measured voltage may change according to the skin impedance.

In some embodiments of the present invention, the gesture control system may operate with a dedicated operation system (OS). In this embodiment, the OS may be used to control and navigate the computerized device (e.g., a smart-watch). Having a display, a displayed menu with four icons corresponding to different fingers of the users (for instance the index finger, the middle finger, the ring finger, and the thumb). Such that moving a particular finger corresponds to a particular icon and the selection may navigate to an additional menu (for example, moving the index finger indicates selecting the letter group "A-G"). This operation may be used to navigate through different letters when writing a text message (e.g., with a smart-watch). Furthermore, such OS may operate with dedicated languages (such as the Braille language as shown in FIGS. 6A-6B).

Referring now to FIGS. 11A-11F, these figures illustrate examples of controlling computerized devices as performed in the prior art and with thumb gestures; by utilizing the gesture based operating system, according to some exemplary embodiments of the disclosed subject matter.

The gesture controlled system may be coupled with a gesture based operating system capable of issuing commands, to control and browse computerized devices (e.g., a smart-watch). In this embodiment, the system detects wrist innervating signals due to a particular movement of the thumbs. Such operating system may perform operations on a computerized device, whether comprising touch screen or not, that do not require observing the screen. The interface of such an operating system may be purely based on thumb gestures, without touching a screen, keyboard, mouse, a combination thereof, or the like.

FIG. 11A shows commercially available solutions of a touch screen user interface (UI) for controlling a wrist watch with a thumb. In some exemplary embodiments, emulating the thumb movement, without an actual screen, as depicted in FIG. 11B, provide a UI element, of the gesture based operating system, to control the wrist watch, in accordance with some embodiments of the present invention.

FIG. 11C shows commercially available solutions of a touch screen UI for controlling a handheld device with a thumb. In some exemplary embodiments, emulating the thumb movement, without an actual screen, as depicted in FIG. 11D, provide a UI element, of the gesture based operating system, to control the handheld device, in accordance with some embodiments of the present invention.

FIG. 11E shows commercially available solutions of a joystick UI for controlling a game console with two thumbs. In some exemplary embodiments, emulating the thumbs movement, without an actual joystick, as depicted in FIG. 11F, provide a UI element, of the gesture based operating system, to control the game console, in accordance with some embodiments of the present invention.

As more electronic communication devices for various platforms are introduced such as Internet of Things (IoT), virtual reality (VR), smart home, smart television, computerized vehicles, for example, controlling these devices with touchscreens or keyboards and/or keyboards are cumbersome particularly for on-the-go activities such as playing music while exercising or manipulating a car function while driving, for example. A smart watch is a wearable user interface that can be configured to control these communication devices by the use of gesture motions as previously described.

The smart watch may include sensors 12, smart wrist straps 10 with flexible form and interconnectivity 17, a processor/computation unit 22 for executing custom algorithms, a communication component 13, and haptic actuators 14 as shown in FIGS. 1A-1B (e.g., smart wrist straps) and the block diagrams of FIG. 2-4, for example. The smart watch design may include a unique trade-off between signal-to-noise ratio (SNR) of the detected bio-electrical signals being processed, comfort, and functionality. For example, a good design may conform well to the wrist of the user so as to increase SNR and reduce motion artifacts in the detected bio-electrical signals to changing contact between the electrodes and the skin of the user during movement.

Figure 12A:
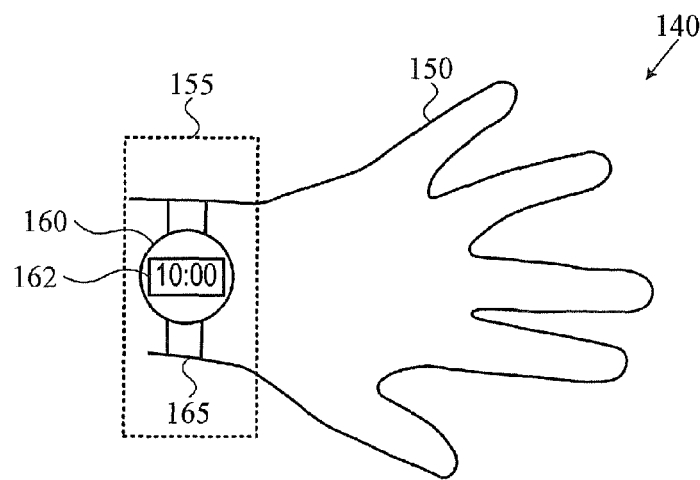
FIG. 12A schematically illustrates a dorsal view of a hand with a smart watch held on a wrist by smart wrist straps, in accordance with some embodiments of the present invention.
Figure 12B:
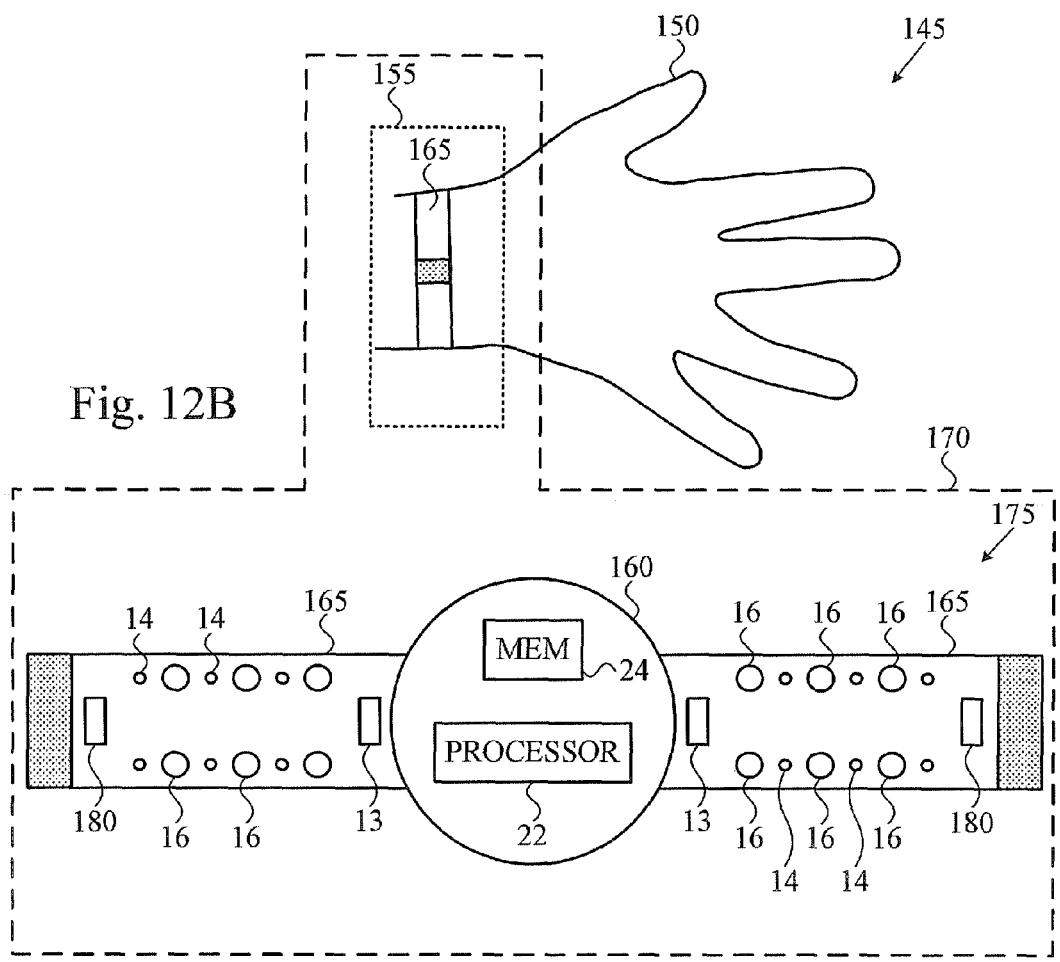
FIG. 12B schematically illustrates a palmar view of a hand with a smart watch held on a wrist by smart wrist straps, in accordance with some embodiments of the present invention.

FIG. 12A schematically illustrates a dorsal view 140 of a hand 150 with a smart watch 160 held on a wrist 155 by smart wrist straps 165, in accordance with some embodiments of the present invention. Smart watch 160 may include a screen 162 where the known gestures made by hand 150 may be used to control screen elements on screen 162 such as selecting icons and/or on computerized devices 29,49. FIG. 12B schematically illustrates a palmar view 145 of hand 150 with smart watch 160 held on wrist 155 by smart wrist straps 165, in accordance with some embodiments of the present invention.

An inset 170 shows a bottom view 175 of smart watch 160. One embodiment of flexible interface 10 in FIG. 1A may include wrist straps 165 with bio-potential electrodes 16 for detecting bio-potential signals. At least one of bio-potential electrodes 16 may include surface nerve conduction (SNC) electrodes used in detecting surface nerve conduction signals. Bio-electrical electrodes 16 are coupled to bio-electrical sensors 12 as in FIG. 1A, for example Wrist straps 155 may include haptic actuators 14 and communication controller 13. Smart watch 160 may include processor 22 for identifying gestures where associations between known gestures and surface nerve conduction, or bio-electrical signals are stored in memory 24.

Processor 22 may include one or more processing units, e.g. of one or more computers. Processor 22 may include a field programmable gate array (FPGA), a graphics processing unit (GPU), a microcontroller, and a microprocessor. Processor 22 may include a remote computer or may include any other suitable processing technology.

Sensors 180 may include any sensors such as inertial measurement units (IMU), pressure sensors, photoplethysmogram (PPG) sensors, and RF sensors, for example. Sensors 180 may be placed at any position along wrist strap 165. Pressure sensors may be used to measure tendon movements. Inertial Measurement Units (IMU) may be used to measure rough movements of hand 150. Pressure sensors may be used to measure force in the movement of the tendons in the arm and hand 150. PPG sensors, such as sensors based on light emitted diode (LED) technology, may be used to measure changes in the volume of the wrist during movements of the wrist tendons. The signals from sensors 180 may be used by processor in addition to the bio-electrical signals detected by bio-electrical sensors 12 from the nerves in the wrist 155 so as to increase the likelihood of identifying the correct gesture from the bio-electrical signals (e.g., SNC signals).

In some embodiments of the present invention, communication controller 13 may relay information between processor 22 and memory 24 in smart watch 160, and bio-potential sensors 12, sensors 180 and haptic actuators 14 on smart wrist strap 165. In other embodiments, processor 22 and memory 24 may also be placed on wrist straps 165. Sensor 180 may include any combination of the above mentioned technologies. As shown in FIG. 1A, the SNC sensors may include an analog front end and an electrode array.

Figure 13:
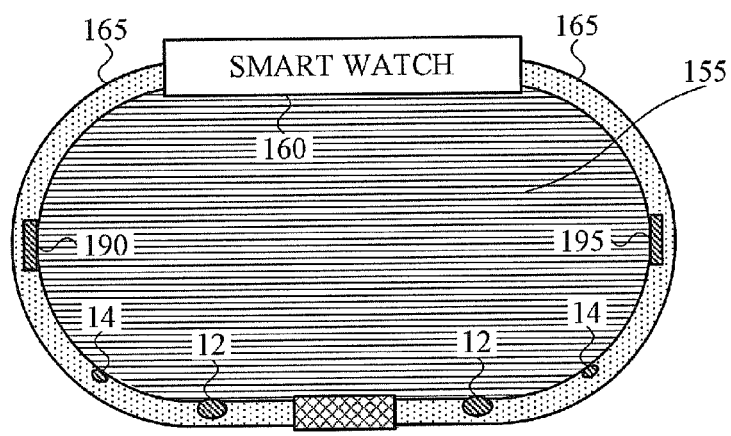
FIG. 13 schematically illustrates a smart watch placed around a wrist configured for reflectometry measurements, in accordance with some embodiments of the present invention.

FIG. 13 schematically illustrates smart watch 160 placed around wrist 150 configured for reflectometry measurements, in accordance with some embodiments of the present invention. Sensors 180 may include RF sensors such as a wave generator 190 and a receiver 195. RF pulses generated by wave generator 190 may be used to measure changes in the reflective index in the tissues of wrist 155 due to different gesture movements as the pulse propagates from generator 190 to receiver 195.

In some embodiments of the present invention, a gesture recognition algorithm (referred to hereinafter as gesture recognition) detects events in the bio-electrical signals due to gestures made by hand 150 that are detected in sensors 12 and applies a classification algorithm to the detected events so as to identify the gestures as described in FIGS. 8A-8B.

FIG. 14A-14D illustrate gestures 200 identifiable by smart watch 160, in accordance with some embodiments of the present invention. Gestures 200 shown in FIGS. 14A-14D are merely for visual clarity. Processor 22 may be configured to identify any suitable hand and finger gestures and are not limited to gestures 200 in FIGS. 14A-14D.

Figure 14A:
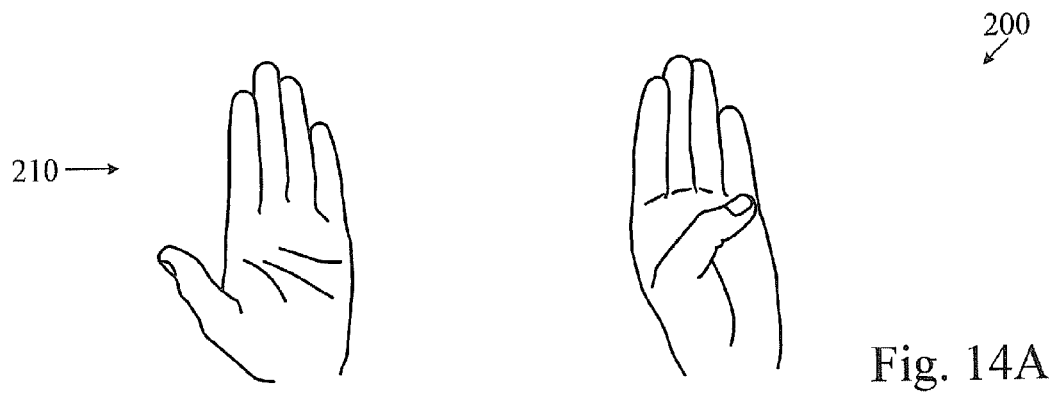
FIG. 14A illustrates a thumb movement gesture identified by a smart watch, in accordance with some embodiments of the present invention.

FIG. 14A illustrates a thumb movement 210 gesture identifiable by smart watch 160, in accordance with some embodiments of the present invention. Thumb movement 210 made by the user, for example, may move the cursor to the right on screen 162 of smart watch 160, and/or on a screen of computerized devices 29, 49, and/or actuate certain functions performed by computerized devices 29, 49.

Figure 14B:
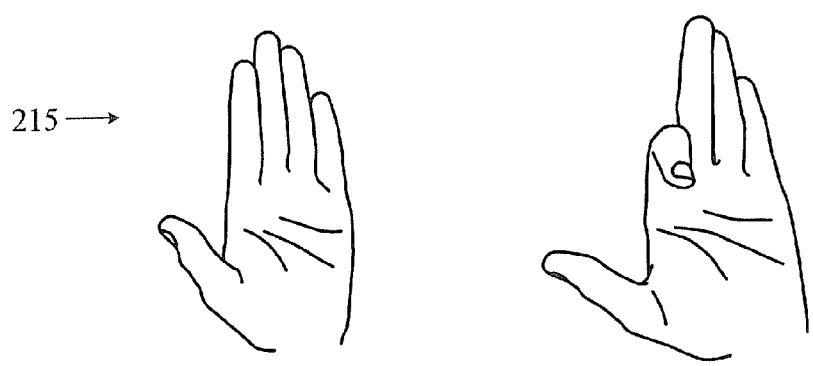
FIG. 14B illustrates an index finger movement gesture identified by a smart watch, in accordance with some embodiments of the present invention.

FIG. 14B illustrates an index finger 215 movement gesture identifiable by smart watch 160, in accordance with some embodiments of the present invention. Index finger movement 215, for example, may move the cursor to the left on screen 162 of smart watch 160, and/or on a screen of computerized devices 29, 49, and/or actuate certain functions performed by computerized devices 29, 49.

Figure 14C:
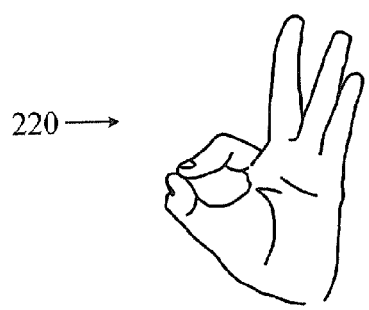
FIG. 14C illustrates a gesture of tapping two fingers together identified by a smart watch, in accordance with some embodiments of the present invention.

FIG. 14C illustrates a gesture of tapping 220 two fingers together identified by smart watch 160, in accordance with some embodiments of the present invention. Tapping 220 at least two fingers together may select items on screen 162 of smart watch 160, for example, and/or on a screen of computerized devices 29, 49, and/or actuate certain functions performed by computerized devices 29, 49.

Figure 14D:
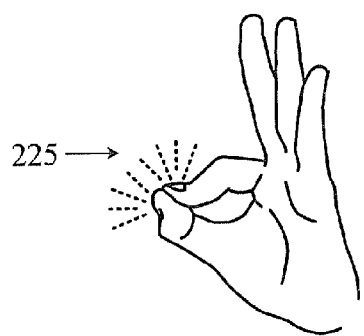
FIG. 14D illustrates a gesture of squeezing two fingers together identified a smart watch 160, in accordance with some embodiments of the present invention.

FIG. 14D illustrates a gesture of squeezing 225 two fingers together identified by smart watch 160, in accordance with some embodiments of the present invention. Squeezing 225, or pressing at least two fingers together may continuously select items on screen 162 of smart watch 160, and/or on a screen of computerized devices 29, 49, and/or actuate certain functions performed by computerized devices 29, 49.

In some embodiments of the present invention, smart watch 160 may be configured to communicate with a radio or a sound system playing music, for example, located in the console of an automobile dashboard. A user may change the volume of the radio speakers by squeezing 225 at least two fingers together. For example, squeezing the index finger and thumb together may be used to increase the volume, and squeezing the middle finger and thumb together may be used to decrease the volume. In other embodiments, an accelerometer may be placed on wrist strap 165. The accelerometer may be used to detect if the index finger and thumb are squeezed together pointing upward (e.g., to increase the volume), or pointing downward (e.g., to decrease the volume).

FIG. 15 is a flowchart depicting a method 250 for communicating between gesture-controlled flexible user interface 10 and computerized device 49, in accordance with some embodiments of the present invention. Method 250 includes detecting 255 one or a plurality of bio-electrical signals from one or a plurality of bio-potential sensors (e.g., sensors 12) placed a body of a user, where the one or a plurality of bio-potential sensors include at least one surface nerve conduction (SNC) sensor for detecting at least one SNC signal. Method 250 includes comparing 260 (e.g., by using a processor 22) the detected at least one SNC signal with data of a plurality of reference signals corresponding to a plurality of known gestures, each of the reference signals distinctly associated with one of the known gestures. The data may be stored in memory 24.

Method 250 may include identifying 265 (e.g., by using a processor 22) a known gesture from the plurality of known gestures that corresponds to the at least one SNC signal. Method 250 may include communicating 270 (e.g., by using a processor 22) the identified known gesture to computerized device 49 via communication device 13.

FIG. 16 is a flowchart depicting a method 300 for identifying a known gesture, in accordance with some embodiments of the present invention. Gesture recognition may include an event detection and a classification algorithm applied to the bio-electrical signals detected 255 from bio-electrical electrodes 16. Method 300 may include de-noising 305 (e.g., by using a processor 22) the detected at least one surface nerve conduction (SNC) signal.

In some embodiments of the present invention, de-noising 305 or filtering noise from the bio-electrical signals may include generating a custom basis function representation for the bio-electrical signal. A discrete wavelet transform (DWT) may be used as an efficient way for generating a sparse representation. The signal within a time frame is transformed in the following manner $$W_\varphi = \int_{-\infty}^{\infty} f(t) \cdot \varphi_{s,\tau}(t) \, dt \quad (6)$$

$$\varphi_{s,\tau(t)} = \frac{1}{\sqrt{s}} \cdot \varphi\left(\frac{t-\tau}{s}\right) \quad (7)$$

where $W_\varphi$ are the wavelet coefficients and $\varphi_{s,\tau(t)}$ is the mother wavelet. The mother wavelet $\varphi$ may be chosen such that f(t) representing the bio-electrical signal is transformed into a sparse domain Small wavelet coefficients can be zeroed out thus achieving an effective de-noising of the bio-electrical signal. In other embodiments, an additional transformation such as principal component analysis (PCA) of the correlation between the bio-electrical signals, e.g., from sensors 16, is given by ($f_1(t), f_2(t), f_3(t) \ldots$) where the index n=1,2,3, ... is the number of the sensor. Calculating the Wavelet coefficients $W_\varphi$ in this manner in Eqn. (6) adds more accuracy to de-noising the bio-electrical signals because the noise detected in the bio-electrical signals between adjacent sensors 12 is correlated since sensors 12 are placed close together on wrist 155. In the embodiments described herein, adjacent sensors that are "close together" may refer to sensors 12 that may be placed on the same limb and within proximity to a muscle group, e.g, less than about 15 cm. Typically, sensors 12 may be placed less than 1 cm. apart, for example, and typically along the path of the action potential signal (e.g., along the nerve). Furthermore, the use of the SNC mother wavelet as a unique basis enables extraction of the SNC signal from EMG signals (e.g., EMG noise). The mother wavelet $\varphi$ may be generated based on data generated by multiple testing trials from many users.

Other noise signals in the detected bio-electrical signals, in addition to EMG noise, may include electrode motion, friction artifacts, 50/60 Hz power supply line noise, and other noise sources which can be mistaken as pressure from neural innervation. Since the noise artifacts may be different in shape than the mother wavelet, the inner product in Eqn. (6) is small and can be zeroed out or neglected in the computation which provides effective de-noising of these unwanted noise signals.

Method 300 may include detecting 310 an event in the at least one SNC signal. Upon de-noising the SNC signals, processor 22 may use an event detection algorithm to decide if a gesture event occurred. For example in FIGS. 7A-7D showing bio-electrical signals detected by sensor 12, processor 22 may detect gesture events, such as bio-electrical signals 72, 74, 76, 78 corresponding to gesture events by hand 150 as described previously.

Method 300 may include applying 315 segmentation to the detected event for determining one or a plurality of time frames where the gesture events occur. In FIGS. 7A-7D, processor 22 may identify segments 71 which indicate the start and stop times, or the time frames where the detected gesture event starts and ends. The embodiments shown in FIGS. 7A-7D illustrate hard segmentation where the start and end frames define a rectangle from a voltage from 0 to 1. In other embodiments of the present invention, soft segmentation may be used where segment 71 may not be rectangular, but any shape tracking the envelope of the detected gesture event, for example. The amplitude of the segment may include any upper value and is not limited to a voltage of 1 as in the case of hard segmentation. In some embodiments, soft segmentation may assign a probability to each sensor sample as belonging to a known gesture event.

Method 300 may include extracting 320 statistical features within the one or a plurality of frames of the detected event. FIG. 8A illustrates four statistical features $f_1$, $f_2$, $f_3$, $f_4$ extracted from Eqns. (1)-(4), respectively, to classify the properties of the bio-electrical signals (e.g., the SNC signals) for three detected gesture events 81, 82, 83 in this example. A feature space as shown in FIG. 8B is constructed with the three features $f_1$, $f_3$, and $f_4$ as discussed previously.

Method 300 may include applying 325 a classification algorithm based on the data related to the SNC signal to the extracted statistical features so as to determine the known gesture. FIG. 8B illustrates the features space with the known gestures 81, 82, 83.

In some embodiments of the present invention, the classification algorithm may include a feature space, for example as shown in FIG. 8B, which is based on the data related to the SNC signal. In other embodiments, the classification algorithm may be configured to identify boundaries between clusters in the feature space so as to increase the likelihood of determining the known gesture from the SNC signals.

In some embodiments of the present invention, soft segmentation may allow for a weighted feature extraction. For example, another statistic feature in addition to Eqns. (1)-(5)

may include correlation between sensors 12 and/or a frame of samples of the bio-electrical signals from sensors 12. Using weighted correlation metrics may provide a more precise way of determining the known gesture.

In some embodiments of the present invention, a gesture classifier (e.g., machine learning) may be used following feature extraction in step 320. The classification algorithm may include a random forest classifier. Multiple random forest classifiers may be trained. De-noising may include the use of a low pass filter. Event detection may include one of the classifiers trained on a stream of data with a fixed window length, for example. The classifier may output a vote on each of the samples. Once the number of votes reaches a threshold, such as for example, where half of the samples in the window length are classified as belonging to a gesture event, snapshots of the gesture may be input to the classifier. The snapshots may include a series of frames from all of sensors 12 at multiple data points until the signal (e.g., event detection) finishes firing, where the event detection window stops toggling between 0 and 1. The data is input to the gesture classifier and trained on multiple snapshots. The random forest classifier analysis described above is useful for evaluating the generalization error. The error may be reduced by aggregating multiple snapshots for prediction.

Proportional control is the translation of bio-electric sensor readings into a continuous control signal, which may be input to computerized device 29. Gesture 225 in which at least two fingers may pressed or squeezed together where the bio-electrical signals detected by sensors 12 may be used to measure, or estimate, the pressure between the at least two fingers. For example, pressing two fingers together may be used to produce a control signal applied to a video device for fast-forwarding a movie being viewed by a user with more pressure applied between the fingers being translated into quicker rate of fast-forwarding the movie, for example. In the same manner, gesture 225 may be used by the driver of a car, for example, to control the volume of the radio in a car while driving by squeezing his fingers together.

The estimation of bio-electrical signal readings into control signals should be smooth and consistent in time so as not to change the parameter such as radio volume or speed of fast forwarding a movie, for example, too quickly. Classification analysis may be used by gesture recognition as depicted by the flowcharts of FIGS. 14 and 15 whereas regression analysis is used in proportional control. Typically classification analysis is used by smart watch 160, for example, to identify gesture 225 by hand 150 and regression analysis applied to the bio-electrical events detected by sensors 12 to translate the gesture to a continuous control signal as described in the proportional control embodiments below.

Figure 17:
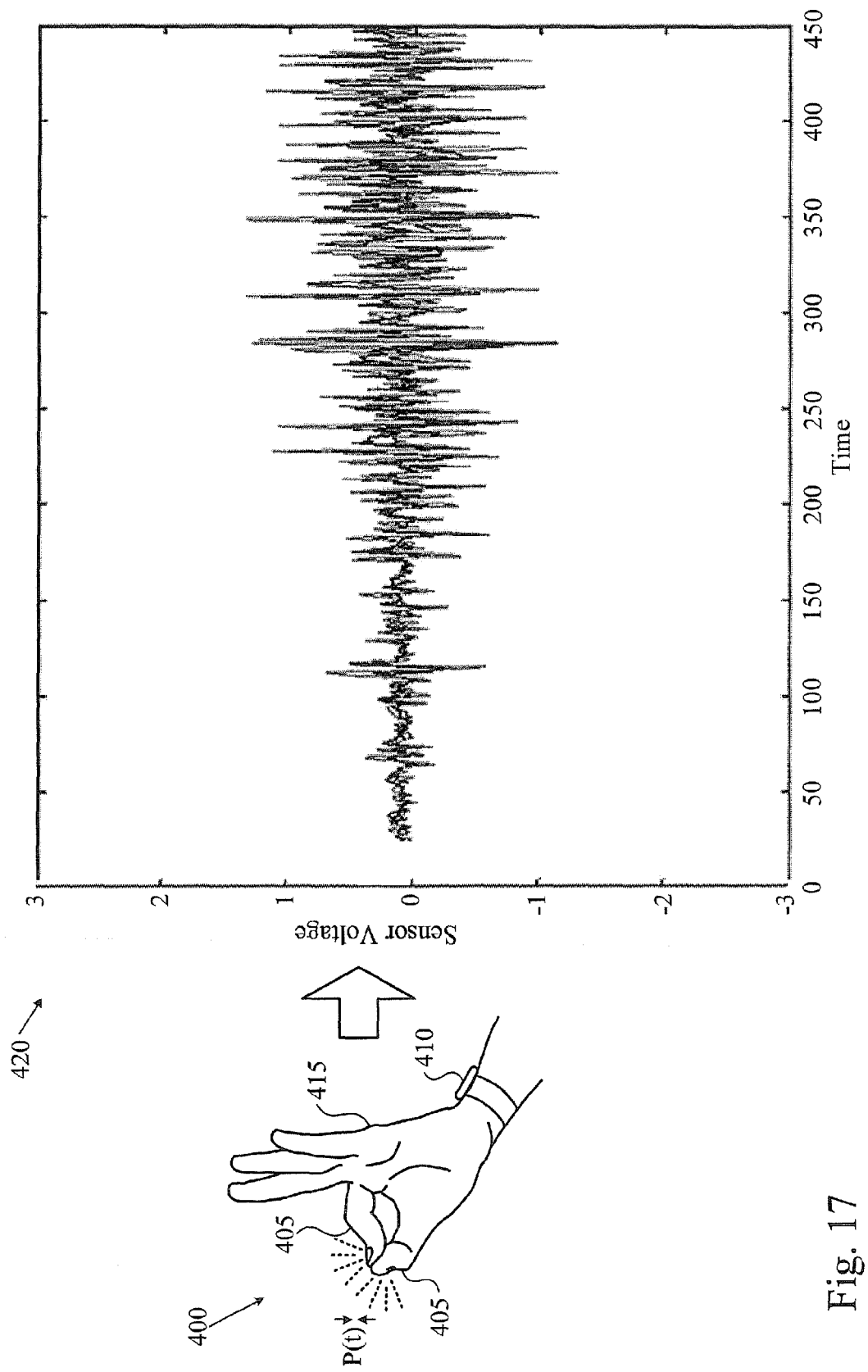
FIG. 17 schematically illustrates a bio-potential signal detected when squeezing two fingers together, in accordance with some embodiments of the present invention.

FIG. 17 schematically illustrates a bio-potential signal 420 detected when squeezing two fingers 405 together, in accordance with some embodiments of the present invention. Bio-potential signal 420 is the signal detected from one of the plurality of sensors 12. A gesture 400 of squeezing together at least two fingers together is shown in FIG. 17. Fingers 405 of hand 415 are squeezed or pressed together with a pressure P(t), where pressure may be represented in any suitable units such as pascals, pounds per square inch (psi), for example. Sensors 12 on in the wrist straps of smart watch 410 detect a sensor voltage 420 in which the amplitude and frequency increase in time proportional to increasing pressure P(t). Stated differently, when the known gesture includes pressing at least two fingers together, and processor 22 is configured to identify the known gesture by assessing that the at least one detected surface nerve conduction signal comprises an amplitude and a frequency proportional to pressure applied between the at least two fingers. Proportional control algorithms as described below may then be applied to extract a pressure control signal that can be applied to computerized device 29.

In some embodiments of the present invention, the classification analyses used for gesture recognition and the regression analyses used for proportional control may use similar data pipelines for processing the data. For example, both the gesture recognition and proportional control data pipelines may use similar algorithms which are first discussed here.

Figure 18:
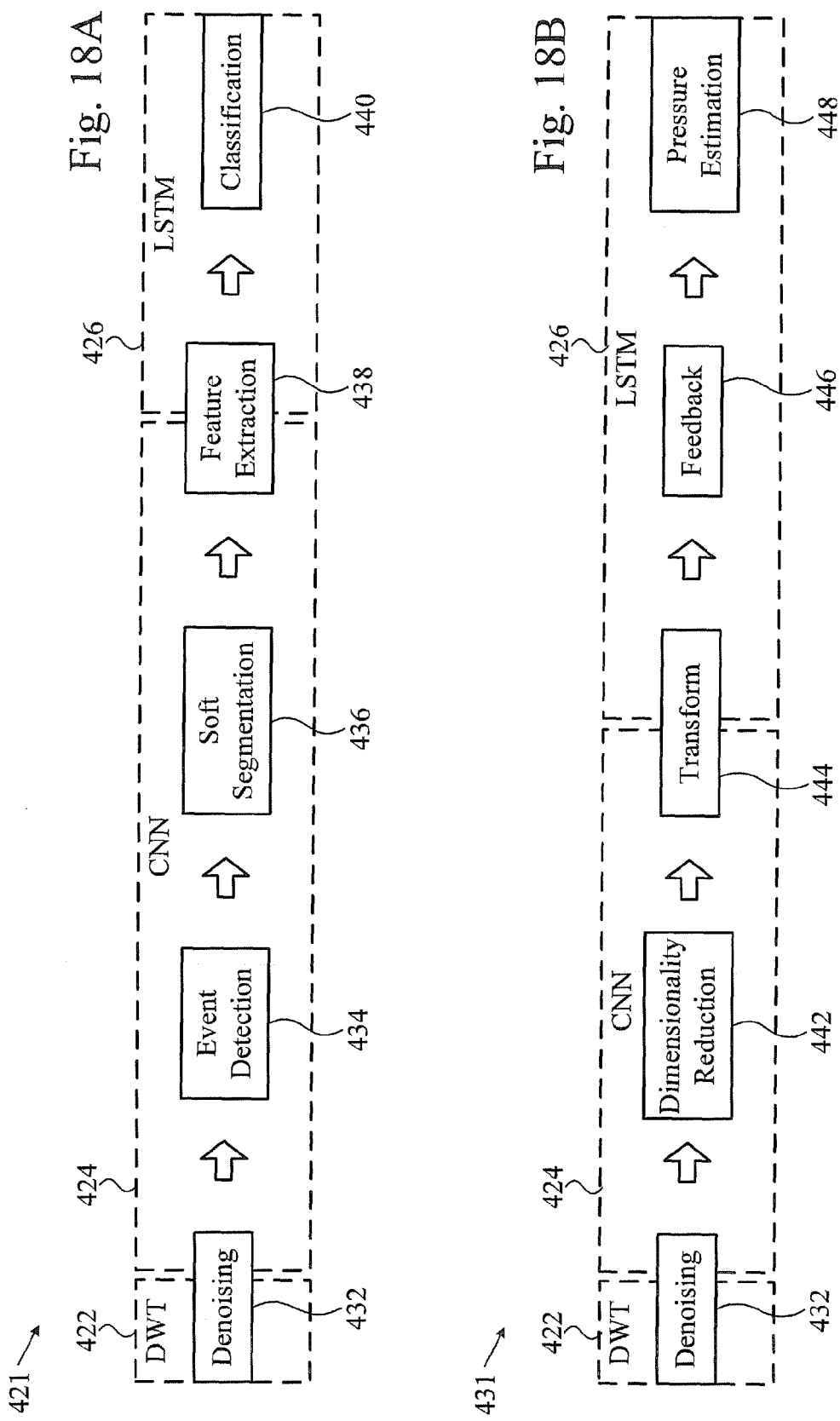
FIG. 18A is a block diagram of a data pipeline for gesture recognition, in accordance with some embodiments of the present invention.
FIG. 18B is a block diagram of a data pipeline for proportional control, in accordance with some embodiments of the present invention.

FIG. 18A is a block diagram 421 of a data pipeline for gesture recognition, in accordance with some embodiments of the present invention. Block diagram 421 includes a de-noising block 432, an event detection block 434, a soft segmentation block 436, a feature extraction block 438, and a classification block 440. Each of these blocks in the data pipeline for gesture recognition was discussed in the flowchart of FIG. 16.

FIG. 18B is a block diagram 431 of a data pipeline for proportional control, in accordance with some embodiments of the present invention. Block diagram 431 includes a de-noising block 432, a dimensionality reduction block 442, a transform block 444, a feedback block 446, and a pressure estimation block 448.

In some embodiments of the present invention, machine learning techniques using neural networks may be used to implement the data flow in both pipelines. The functional blocks as described above representing the gesture recognition and proportional control pipelines in FIGS. 18A-18B may be implemented with the same algorithms, or pipeline architecture, processing the one or a plurality of bio-electrical signals using a discrete wavelet transform (DWT) 422 (as described previously), a convolutional neural network (CNN) 424, and a long short term memory (LSTM) neural network 426 as will be described later. CNN 424 is a neural network chosen for managing bio-electrical signals that are detected from sensors 12 placed in close proximity on the wrist. CNN 424 is effective in processing detected signals which are correlated. LSTM 426 maintains a memory of the bio-electrical signal in time (e.g., time frame) and may detect patterns in the signals over short and long periods of time as will be discussed later in the combined pipeline architecture.

Following the proportional control pipeline 431 for estimating the pressure between the at least two fingers, de-noising 422 the one or plurality of bio-electrical signals detected by sensors 12 (e.g., de-noising block 432) may use a discrete wavelet transform (DWT) as described previously for the gesture recognition pipeline. De-noising the bio-electrical signals may include, for example, removing EMG signal noise from the SNC signals.

In some embodiments of the present invention, dimensionality reduction 442 in pipeline 431 may be used to reduce the amount of data so as to leave only important data relevant for gesture detection and to reduce the complexity of the detection. There are various techniques to achieve this:

A. Unsupervised dimensionality reduction: In some embodiments of the present invention, using techniques such as NMS (non-negative matrix factorization), the dimensionality of the data within a frame can be reduced, that is, the detected data from sensors 12 can be reduced into a single frame representing a single time series. This reduction may be done by minimizing a cost function:

$$\min_{W,H} \|F - W \cdot H\|^w \qquad (8)$$

subject to the condition W,H≥0, where F represents the original bio-electrical signal data after de-noising with frames arranged in a matrix form, H is the hidden variable (e.g., pressure applied between fingers 405), and W is the weight matrix, where each sample in a frame contributes to the reconstruction of F via W. The choice of the norm in Eqn. (8) is used to tune the minimization for the proportional control application.

B. Supervised Unlabeled dimensionality reduction: In some embodiments of the present invention, the data F may be reduced via an auto-encoder neural network. The architecture may include a feedforward neural network, but instead of training the network on a dataset $D_F$ (e.g., multiple examples of frames $F_i$) so as to predict labels $Y_i$ (classification), the network may be trained to reconstruct the input $D_F$. The constraint may be applied that the number of hidden layer nodes in the auto-encoder neural network is smaller than the number of input layer nodes, forcing the network to learn a compact representation of itself. The hidden layers may be used for dimensionality reduction.

C. Supervised Labeled dimensionality reduction: In some embodiments of the present invention, supervised labeled dimensionality reduction is a regression problem, where the input\output relationship is established via a certain analytic function. This technique may be more applicable after the transformation step 444. Furthermore, this relationship may not be necessarily linear. Therefore, classic linear regression is not applicable. Random forest regression and least absolute shrinkage and selection operator (LASSO) regression are more suited to such a problems.

A modern approach to supervised time series learning is the recurrent neural network, in particular LSTM (Long Short Term Memory). In contrast to more "classic" learning methods, LSTM neural networks may handle serial data in a way that takes into account context. More specifically, the LSTM network may take in account data from previous frames. All other methods may process a fixed size frame. Feedback from previous frames is provided, yet the feedback is also pre-defined (by fixing a number of previous frames). Therefore, LSTM provides a more flexible means to handle data due to its unique hidden state formulation.

Supervised learning requires labeled datasets. In some embodiments of the present invention, after processor 22 identifies known gesture 400, in order to label data from gesture 400 derived from the bio-electrical signals from sensors 12, an auxiliary signal is provided to the user. For example, a sound signal may be played to the user. The sound signal may vary in frequency and\or in amplitude. The user may be instructed to change the pressure P(t) between fingers 405 in proportion to the auxiliary signal that the user hears. The data from sensors 12 is recorded and further provided as a label set Y to the data $D_F$. The response time between when the user hears the sound signal to the user's reaction may be taken in account to prevent a mismatch between Y and $D_F$.

In some embodiments of the present invention, transform 444 in pipeline 431 may be used to precondition or post-condition the data through pipeline 431. In the case of supervised learning, transform 444 may be used as a pre-processing step to enable a better estimation of the pressure learning step and to introduce domain knowledge to the system (e.g., the characteristics of sensitivity to amplitude and frequency from neural recording). For other dimensionality reduction techniques, transform step 444 follows dimensionality reduction step 442 in order to translate the output into a more meaningful signal.

In some embodiments of the present invention, transform 444 may include a filtered Teager-Kaiser energy operator as a post-processing formulation. This operator is defined as:

$$TK[f(t_i)] = f(t_i)^2 - f(t_{i-1}) \cdot f(t_{i+1}) \qquad (9)$$

where f(t) is the bio-electrical signal and the TK operator is proportional to the instantaneous frequency and amplitude of the signal.

In the pre-processing formulation, a filter includes CNN (convolutional neural network) 444. This method is proven to learn effective local transformations, similar to engineered filters, such as Fourier based low-pass/high-pass or the TK operator.

For proportional control application, the auxiliary signal may be transformed via the filtered TK operator using Eqn. (9). The auxiliary signal is noise-free, and therefore ideal for the TK transform. CNN 424 can learn such a representation. The advantage over simply filtering and transforming the data is that such a neural network is derived from data, making it more robust to noise. However, such a network requires significant amount of data and is much more computationally expensive.

Figure 19:
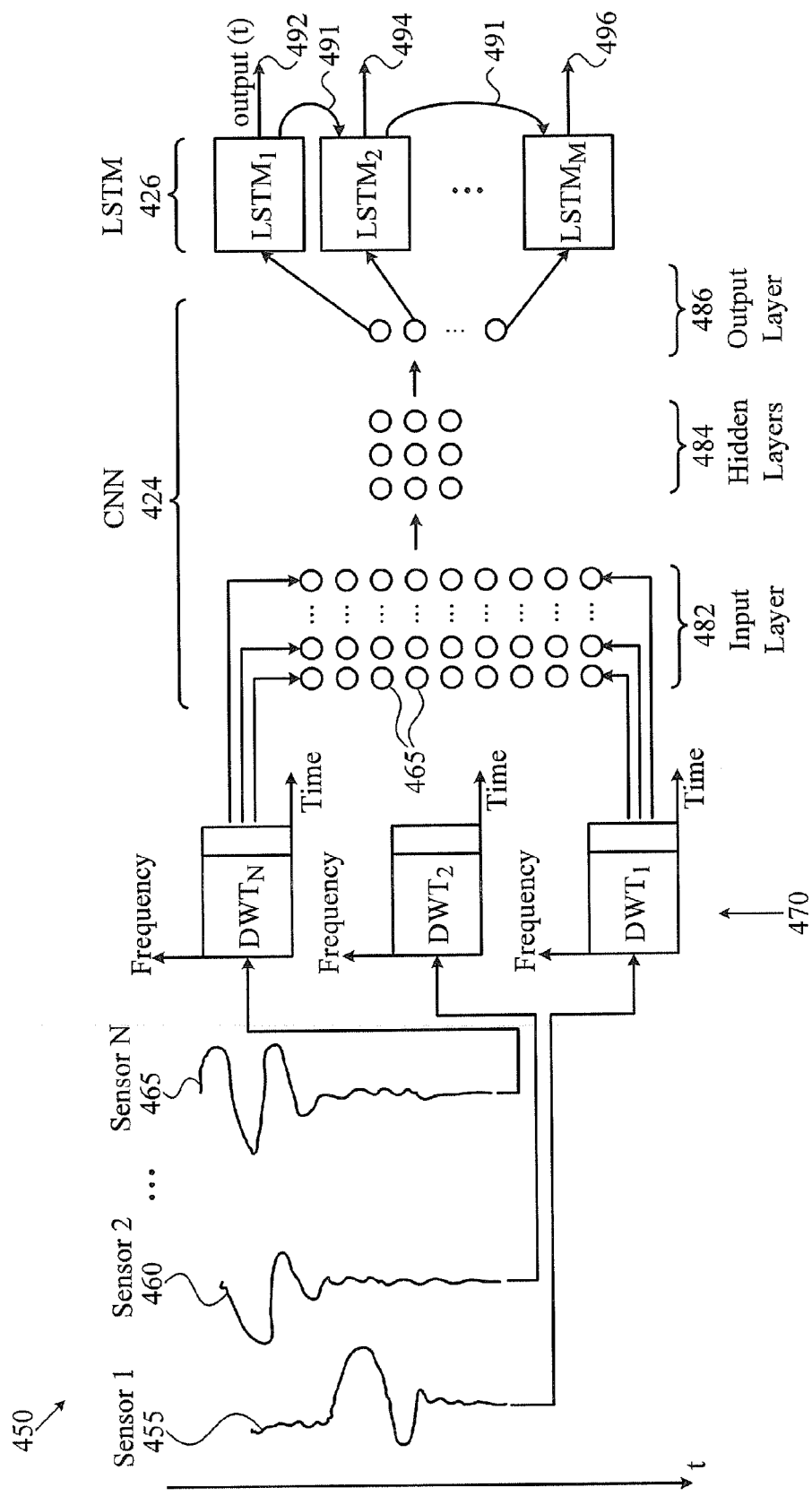
FIG. 19 schematically illustrates a combined pipeline architecture using neural networks, in accordance with some embodiments of the present invention.

FIG. 19 schematically illustrates a combined pipeline architecture 450 using neural networks, in accordance with some embodiments of the present invention. Combined pipeline architecture 450 may include DWT 470 and CNN 424 for de-noising 432 and dimensionality reduction 442 blocks, combined with LSTM 426 for implementing transform 444 and feedback 446 blocks. Note that combined pipeline architecture 450 may be used both for implementing the gesture recognition (GR) pipeline 421 and proportion control (PC) pipeline 431. However, the difference between implementing the GR and PC pipelines is that the neural networks (e.g., CNN 424 and LSTM 426) may be trained either to implement gesture recognition or implement proportional control.

Combined pipeline architecture 450 may include a number n bio-electrical signals detected by n sensors 12 where n is an integer. Bio-electrical signal 455 from $sensor_1$, bio-electrical signal 460 from $sensor_2$, and bio-electrical signal 465 from $sensor_n$ may be input to respective DWT cells or blocks 422 denoted $DWT_1, DWT_2, \ldots DWT_n$. Each of the overlapping fragments in bio-electrical signals 455, 460, and 465 from each of the respective sensors may be decomposed using discrete wavelet transform (DWT). The outcome of the decomposition is a single matrix for each sensor and time frame. The matrix elements may include convolution of the bio-electrical signal with a bank of custom wavelets resulting in an over-complete sparse basis ready for de-noising (e.g., for removal of irrelevant data). In this formulation, many matrix element coefficients may be small and negligible, thereby enabling a sparse representation of the shape and trends in the data. Since the electrodes may be placed in the vicinity of one another and may be sampled together, the signals may be correlated to one another (e.g., both the signal and noise). By representing such a signal set with a sparse basis, observations may be inferred from the shape of the data (represented by DWT coefficients) and the trends in time (changes in DWT coefficients).

At each time frame, each slice of DWT 422 has a corresponding input node 485 in input layer 482 of CNN 424. CNN 424 is configured to have a hidden layer 484 with fewer nodes than input layer 482 thereby enabling dimensionality reduction 442. Since the signals are correlated due to electrode 16 proximity, CNN 424 is configured to reduce the amount of data. This is possible due to the spatio-temporal correlation of the bio-electrical signals. Reducing the dimensionality of the data while removing the unnecessary components allows for the extraction of features of interest, in order to condition the data prior to classification or regression. The interconnections between nodes 485 include weights. Each node may include a transformation such as log or sigmoid transformation, for example. Nodes 485 in a CNN output layer 486 of CNN 424 may be used as input vectors to an LTSM 426 machine at each time frame.

LSTM 426 has m cells denoted $LSTM_1$, $LSTM_2$, ..., $LSTM_m$, where m is an integer. CNN nodes 485 in CNN output layer 486 are connected to the inputs of the m LSTM cells as shown in FIG. 19. Each of the m LSTM cells has a hidden gate connection 491 which provide a memory mechanism manifested in the LSTM hidden gates). m' multiple layers of LSTM cells, where m' is an integer, can be stacked to achieve a more abstract representation of the data (not shown in FIG. 19). Note that in combined pipeline architecture 450, feedback 446 is integrated into the memory mechanism of the LSTM). The output 492 of $LSTM_1$, output 494 of $LSTM_2$, ... output 496 of $LSTM_m$ are samples of the estimated pressure P(t) between fingers 405 squeezed together in sequential time frames.

The m LSTM memory cells may receive an input and output decision based on the inputs (e.g., outputs from CNN 424) which provide hidden memory of the signals based on previous inputs. During training, the LSTM cell may receive the features (e.g., local descriptors), the network data and the outcomes of the previous LSTM cell decision. With the unique hidden layer of LSTM 426, LSTM 426 can detect patterns over long and short periods of data (e.g., unique memory component of variable length).

In some embodiments of the present invention, LTSM 426 machine can be trained using the auxiliary signal previously described. The auxiliary signal may represent pressure, such as a user changing the pressure between fingers 405 in response to hearing change in frequency and volume of a sound signal, for example. Similarly, the auxiliary signal may include discrete signals representing gestures. The LSTM network will receive the auxiliary signal data (supervised learning) and converge to a solution.

Figure 20:
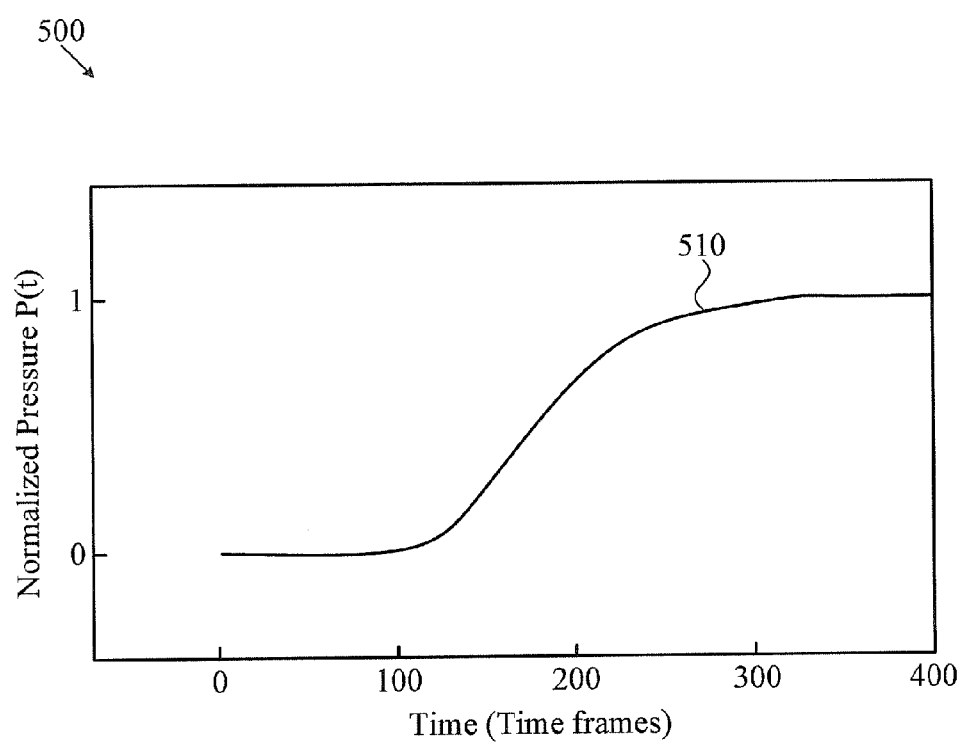
FIG. 20 is a graph illustrating the normalized pressure versus time frame when squeezing together two fingers estimated using a combined pipeline architecture, in accordance with some embodiments of the present invention.

FIG. 20 is a graph 500 illustrating the normalized pressure versus time frame when squeezing together two fingers 405 estimated using combined pipeline architecture 450, in accordance with some embodiments of the present invention. As user of smart watch 410 squeezes fingers 405 together in gesture 400 with increasing pressure, the estimated normalized pressure from pressure estimation block 448 increases until the user can no longer squeeze together fingers 405 any harder, and thus, normalized P(t) saturates at a value of 1. Graph 500 may be generated by concatenating representative plots of outputs 492, 494, and 496 from $LSTM_1$, $LSTM_2$, ... $LSTM_m$ respectively versus the time frame.

In some embodiments of the present invention, the input of the feedback 446 loop may be such that the "instantaneous" pressure is already estimated. Feedback 446 provides a means to use the input signal together with a control loop to stabilize the output. This may be useful to eliminate instantaneous fluctuations in the detected bio-electrical signals while squeezing fingers 405 together which otherwise may limit the use of the signal for control of computerized device 29 (e.g., the volume of a car radio, the speed of fast-forwarding a video, for example). A control signal does not necessarily need to be the most accurate, but stable enough to achieve the user's intent.

In some embodiments of the present invention, the feedback loop may include various architectures. The simplest architecture may include a weighted average of the pressure at a certain time step with pressure from previous time samples:

$$\tilde{P}(t_i) = w_0 P(t_i) + w_1 P(t_{i-1}) + w_2 P(t_{i-2}) + \quad (10)$$

The above formulation is equivalent to a low pass filter of the output pressure signal. A more complex architecture may include a more complex filter or a control feedback loop, such as a proportional-integral-derivative controller (PID) controller, for example.

In some embodiments of the present invention, the operation of gesture controlled system as depicted in the flowchart of FIG. 5 may include a wearable keyboard. Haptic feedback may be provided to a user wearing the glove on the user's hand for enhanced text write learning and/or enable text reading.

Figures 21A, 21B:
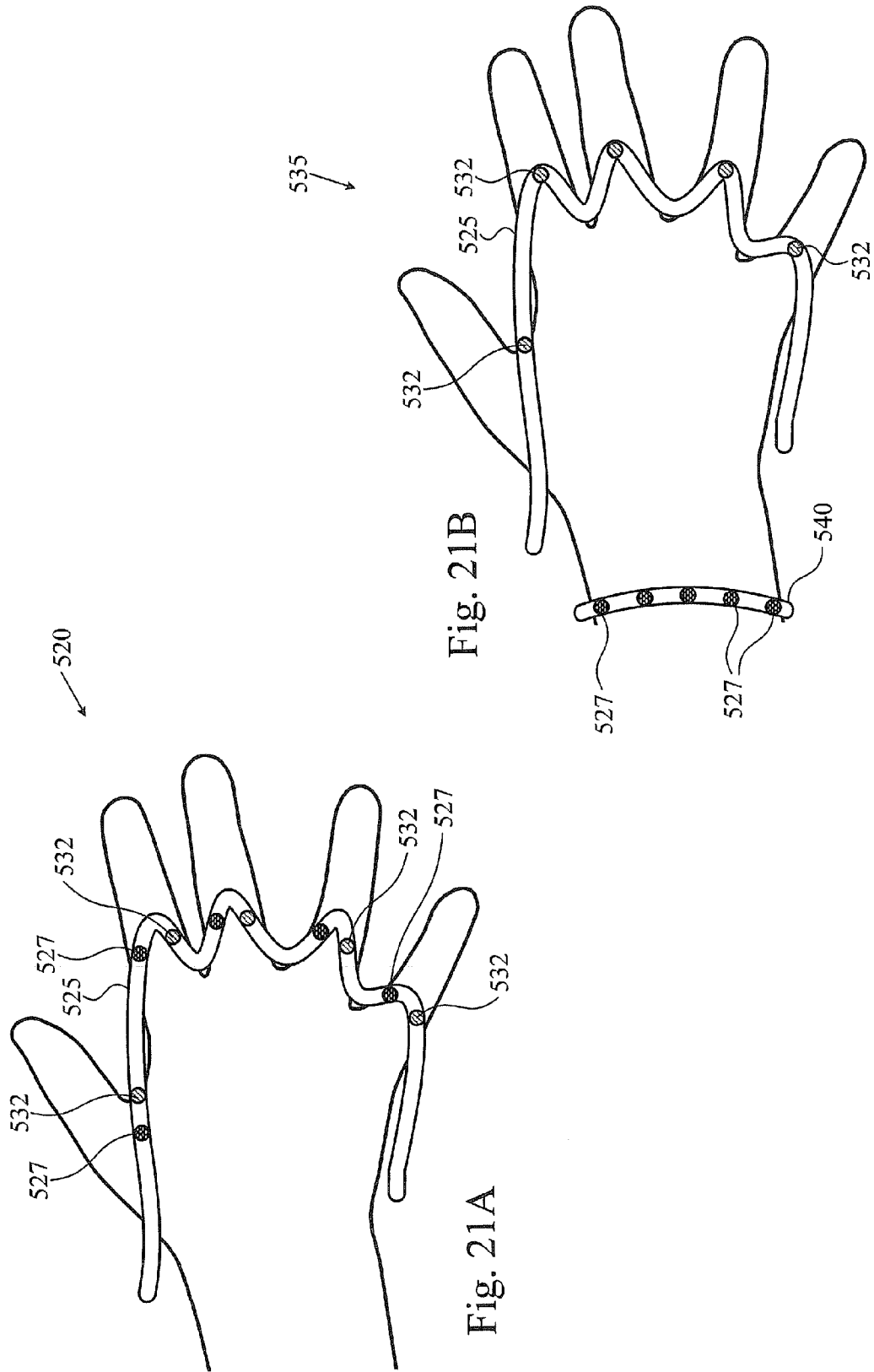
FIG. 21A schematically illustrates a first embodiment of a glove with haptic feedback, in accordance with some embodiments of the present invention.
FIG. 21B schematically illustrates a second embodiment of a glove with haptic feedback, in accordance with some embodiments of the present invention.

FIG. 21A schematically illustrates a first embodiment 520 of a glove 525 with haptic feedback, in accordance with some embodiments of the present invention. Glove 525 worn by a user includes haptic actuators 527 and sensors 532 such as an inertial measurement unit (IMU) for detecting finger motion of the user. Writing text through finger gestures when the glove may be used as a wearable keyboard may be facilitated by training the gestures of glove 525 by providing haptic feedback to the user with haptic actuators 527. Similarly, glove 525 may be used to read text through haptic feedback to the user as described previously. Glove 525 may include a processor running algorithms and other circuitry for detecting hand and finger motions from sensors 532 and to actuate haptic feedback to the user.

FIG. 21B schematically illustrates a second embodiment 520 of a glove 525 with haptic feedback, in accordance with some embodiments of the present invention. Glove 525 worn by a user may include only sensors 532 for detecting finger motions. However, a wrist strap 540 worn by the user may include only haptic actuators 527 for providing haptic feedback to the user. Wrist strap 540 may communicate with glove 525 and receive information regarding the finger motions of the user. Wrist strap 540 may provide haptic feedback to the user in response to the finger motions.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A gesture-controlled interface apparatus comprising:
    a strap configured to be worn on a wrist of a user, comprising one or a plurality of bio-potential sensors, for detecting one or a plurality of bio-electrical signals from the wrist of the user, wherein the one or a plurality of bio-potential sensors include at least one surface nerve conduction (SNC) sensor for detecting at least one surface nerve conduction signal from nerves in the wrist,
    wherein each of the detected one or a plurality of bio-electrical signals has an amplitude proportional to pressure applied to squeezed fingers;
    a processor configured to translate the one or a plurality of bio-electrical signals to a pressure control signal proportional to pressure applied to the squeezed fingers, and to apply the pressure control signal to a computerized device.

2. The apparatus according to claim 1, wherein the one or a plurality of bio-potential sensors are selected from the group consisting of surface electromyography (sEMG) sensors, capacitive electromyography (cEMG) sensors, and skin conductivity sensors.

3. The apparatus according to claim 1, wherein the squeezed fingers comprises at least two fingers pressed together.

4. The apparatus according to claim 1, wherein the each of the detected one or a plurality of bio-electrical signals has a frequency proportional to pressure applied to squeezed fingers.

5. The apparatus according to claim 1, wherein the processor is configured to apply the pressure control signal to the computerized device so as to smoothly change a parameter of the computerized device.

6. The apparatus according to claim 1, wherein the processor is configured to apply proportional control algorithms to the one or a plurality of bio-electrical signal by using a transform in a proportional control data pipeline to introduce domain knowledge as a pre-processing step.

7. The apparatus according to claim 1, wherein the processor is configured to compare the detected at least one surface nerve conduction signal with data of a plurality of reference signals corresponding to a plurality of known gestures, each of the reference signals distinctly associated with one of the known gestures, so as to identify a known gesture of said plurality of known gestures.

8. The apparatus according to claim 7 further comprising at least one motion sensor configured to detect movement of the body, and wherein the processor is configured to identify the known gesture using the detected movement.

9. The apparatus according to claim 7, further comprising haptic actuators configured to activate haptic feedback on the body of the user when the identified known gesture is registered in the computerized device.

10. The apparatus according to claim 7, wherein the processor is configured to train the data for the body of the user by using the one or a plurality of bio-electrical signals to associate the at least one surface nerve conduction signal with each of the plurality of known gestures.

11. The apparatus according to claim 7, wherein the processor is configured to identify the known gesture by de-noising the detected at least one surface nerve conduction (SNC) signal, detecting an event in the at least one SNC signal, applying segmentation for determining one or more frames of the detected event, extracting statistical features within the one or more frames, and applying a classification algorithm based on the data to the extracted statistical features so as to determine the known gesture.

12. The apparatus according to claim 7, wherein the processor is configured to identify the known gesture by applying the one or a plurality of detected bio-electrical signals to a gesture recognition pipeline.

13. A method for communication between a gesture-controlled interface apparatus and a computerized device, the method comprising:
    detecting one or a plurality of bio-electrical signals from one or a plurality of bio-potential sensors placed on a wrist of a user, wherein the one or a plurality of bio-potential sensors include at least one surface nerve conduction (SNC) sensor for detecting at least one surface nerve conduction signal from nerves in a wrist of the user, and each of the detected one or a plurality of bio-electrical signals has an amplitude proportional to pressure applied to squeezed fingers;
    using a processor, translating the one or a plurality of bio-electrical signals to a pressure control signal proportional to pressure applied to the squeezed fingers; and
    applying the pressure control signal to a computerized device.

14. The method according to claim 13, further comprising estimating the pressure applied to the squeezed fingers by applying the one or a plurality of detected bio-electrical signals to a proportional control pipeline including a convolutional neural network (CNN) and a long short term memory (LSTM) neural network.

15. The method according to claim 14, further comprising training the LSTM neural network by using an auxiliary signal.

16. The method according to claim 13, wherein the squeezed fingers comprises at least two fingers pressed together.

17. The method according to claim 13, wherein each of the detected one or a plurality of bio-electrical signals has a frequency proportional to pressure applied to squeezed fingers.

18. The method according to claim 13, further comprising applying the pressure control signal to the computerized device so as to smoothly change a parameter of the computerized device.

19. The method according to claim 13, further comprising applying proportional control algorithms to the one or a plurality of bio-electrical signal by using a transform in a proportional control data pipeline to introduce domain knowledge as a pre-processing step.

20. The method according to claim 13, further comprising comparing the detected at least one surface nerve conduction signal with data of a plurality of reference signals corresponding to a plurality of known gestures, each of the reference signals distinctly associated with one of the known gestures, so as to identify a known gesture of said plurality of known gestures.

21. The method according to claim 20, wherein identifying the known gesture comprises de-noising the detected at least one surface nerve conduction (SNC) signal, detecting an event in the at least one SNC signal, applying segmentation for determining one or more frames of the detected event, extracting statistical features within the one or more frames, and applying a classification algorithm based on the data to the extracted statistical features so as to determine the known gesture.

22. The method according to claim 20, wherein identifying the known gesture comprises applying the one or a plurality of detected bio-electrical signals to a gesture recognition pipeline.

* * * * *